US012758447B2

(12) United States Patent
Newkirk et al.

(10) Patent No.: US 12,758,447 B2

(45) Date of Patent: Oct. 13, 2026

(54) PATIENT SUPPORT APPARATUS WITH STEP ASSEMBLY

(71) Applicant: Hill-Rom Services, Inc., Batesville, IN (US)

(72) Inventors: David C. Newkirk, Lawrenceburg, IN (US); Chelsea Olson Riehle, Batesville, IN (US); Laxmi N. Pothu, Hyderabad (IN)

(73) Assignee: Hill-Rom Services, Inc., Batesville, IN (US)

( * ) Notice: Subject to any disclaimer, the term of this patent is extended or adjusted under 35 U.S.C. 154(b) by 37 days.

(21) Appl. No.: 18/619,785

(22) Filed: Mar. 28, 2024

(65) Prior Publication Data

US 2024/0325224 A1 Oct. 3, 2024

Related U.S. Application Data

(60) Provisional application No. 63/455,721, filed on Mar. 30, 2023.

(51) Int. Cl.

*A61G 7/053* (2006.01)

*A61G 7/015* (2006.01)

(52) U.S. Cl.

CPC ............. *A61G 7/053* (2013.01); *A61G 7/015* (2013.01)

(58) Field of Classification Search

CPC ......... E06C 1/005; A47C 12/00; A61G 7/053; A61G 7/05; A61G 7/015; B60R 3/02; B60R 3/007

USPC ............................................... 5/662; 280/163

See application file for complete search history.

(56) References Cited

U.S. PATENT DOCUMENTS

| | | | | |
|---|---|---|---|---|
| 3,833,240 | A * | 9/1974 | Weiler | B60R 3/02 280/166 |
| 4,190,280 | A | 2/1980 | Donohoe | |
| 4,222,136 | A * | 9/1980 | Valentino | A61G 7/053 5/507.1 |
| 4,564,965 | A | 1/1986 | Goodwin | |
| 5,505,476 | A * | 4/1996 | Maccabee | B60R 3/02 280/166 |
| 6,766,547 | B1 | 7/2004 | Lagassey | |
| 10,022,283 | B2 | 7/2018 | Lawless | |
| 10,316,584 | B1 * | 6/2019 | Cooper | E06C 1/005 |
| 10,987,259 | B2 * | 4/2021 | Lazaro Caetano | A61G 1/04 |
| 2006/0174412 | A1 | 8/2006 | Hornig | |

(Continued)

FOREIGN PATENT DOCUMENTS

| | | | |
|---|---|---|---|
| CN | 209347533 | U | 10/2018 |
| CN | 209695584 | U | 11/2019 |
| CN | 211095941 | U | 7/2020 |

(Continued)

*Primary Examiner* — Justin C Mikowski

*Assistant Examiner* — George Samuel Gines

(74) *Attorney, Agent, or Firm* — Price Heneveld LLP

(57) ABSTRACT

A patient support apparatus includes a frame assembly. The base frame includes rollers for engaging an underlying surface and an upper frame is operably coupled to the base frame. The upper frame is adjustable relative to the base frame. A step assembly is operably coupled to the base frame. The step assembly includes at least one support step operable between a deployed position and a stowed position. The support step is disposed between the base frame and the underlying surface when in the stowed position.

3 Claims, 13 Drawing Sheets

(56) References Cited

U.S. PATENT DOCUMENTS

| | | | | |
|---|---|---|---|---|
| 2007/0056102 A1* | 3/2007 | Smith | ................ | A61G 13/0018 5/507.1 |
| 2016/0136018 A1* | 5/2016 | DeLuca | ................. | A61G 7/012 5/611 |

FOREIGN PATENT DOCUMENTS

| | | | | |
|---|---|---|---|---|
| CN | 211409768 U | * | 9/2020 |
| CN | 211583883 U | | 9/2020 |
| CN | 216124694 U | | 3/2022 |
| CN | 216777388 U | * | 6/2022 |
| KR | 100911822 B1 | | 8/2009 |
| KR | 102459284 B1 | | 10/2022 |

* cited by examiner

PATIENT SUPPORT APPARATUS WITH STEP ASSEMBLY

CROSS-REFERENCE TO RELATED APPLICATION

This application claims priority to and the benefit under 35 U.S.C. § 119(e) of U.S. Provisional Application No. 63/455,721, filed on Mar. 30, 2023, entitled "PATIENT SUPPORT APPARATUS WITH STEP ASSEMBLY," the disclosure of which is hereby incorporated herein by reference in its entirety.

FIELD OF THE DISCLOSURE

The present disclosure generally relates to a step assembly, and more particularly to a patient support apparatus with an integrated step assembly.

SUMMARY OF THE DISCLOSURE

According to one aspect of the present disclosure, a patient support apparatus includes a frame assembly. The base frame includes rollers for engaging an underlying surface and an upper frame is operably coupled to the base frame. The upper frame is adjustable relative to the base frame. A step assembly is operably coupled to the base frame. The step assembly includes at least one support step operable between a deployed position and a stowed position. The at least one support step is disposed between the base frame and the underlying surface when in the stowed position.

According to another aspect of the present disclosure, a patient support apparatus includes a frame assembly. A base frame includes rollers for engaging an underlying surface, and an upper frame is operably coupled to the base frame. The upper frame is adjustable relative to the base frame. A step assembly is operably coupled to the frame assembly. The step assembly includes a coupling feature fixed to the frame assembly. The coupling feature is fixed to at least one of a bottom surface of the base frame, a side surface of the base frame, and a lower surface of the upper frame. At least one support step is coupled to the frame assembly via the coupling feature. The at least one support step is operable between a deployed position and a stowed position.

According to another aspect of the present disclosure, a patient support apparatus includes a frame assembly including rollers for engaging an underlying surface. A step assembly is operably coupled to the frame assembly. The step assembly includes a first support step coupled to the frame assembly at a first location. The first support step is operable between a deployed position for supporting a caregiver and a stowed position. A second support step is coupled to the frame assembly at a second location. The first support step is operable between a deployed position for supporting a caregiver and a stowed position. Each of the first support step and the second support step are configured to be adjusted between the stowed position and the deployed position, respectively, as the frame assembly is moving across the underlying surface during a transport process.

These and other features, advantages, and objects of the present disclosure will be further understood and appreciated by those skilled in the art by reference to the following specification, claims, and appended drawings.

DETAILED DESCRIPTION

Figure 1:
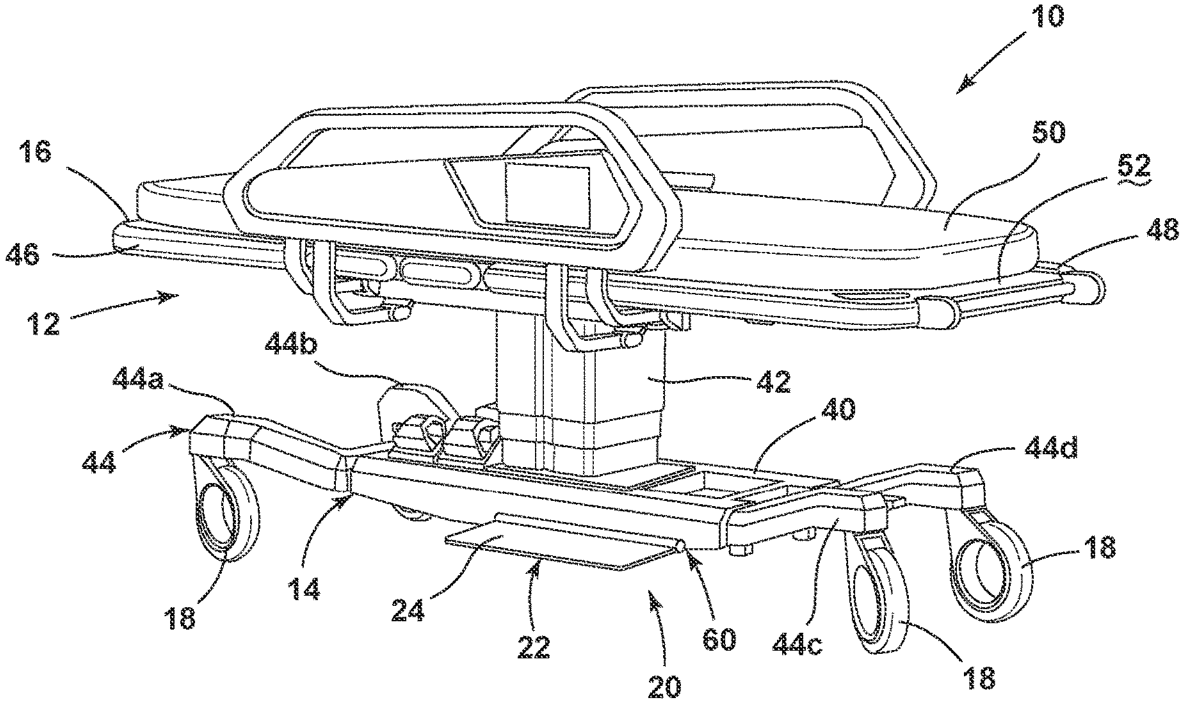
FIG. 1 is a side perspective view of a support apparatus including a step assembly, according to the present disclosure.

The present illustrated embodiments reside primarily in combinations of method steps and apparatus components related to a patient support apparatus with a step assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With reference to FIGS. 1-13, reference numeral 10 generally designates a patient support apparatus that includes a frame assembly 12 with a base frame 14 and upper frame 16. The base frame 14 includes rollers 18 for engaging an underlying surface. The upper frame 16 is operably coupled to the base frame 14 and is adjustable relative to the base frame 14. A step assembly 20 is operably coupled to the frame assembly 12. The step assembly 20 includes at least one support step 22 operable between a deployed position 24 for supporting a caregiver and a stowed position 26. The at least one support step 22 is configured to move between the deployed position 24 and the stowed position 26 as the support apparatus 10 is moving.

Figure 2:
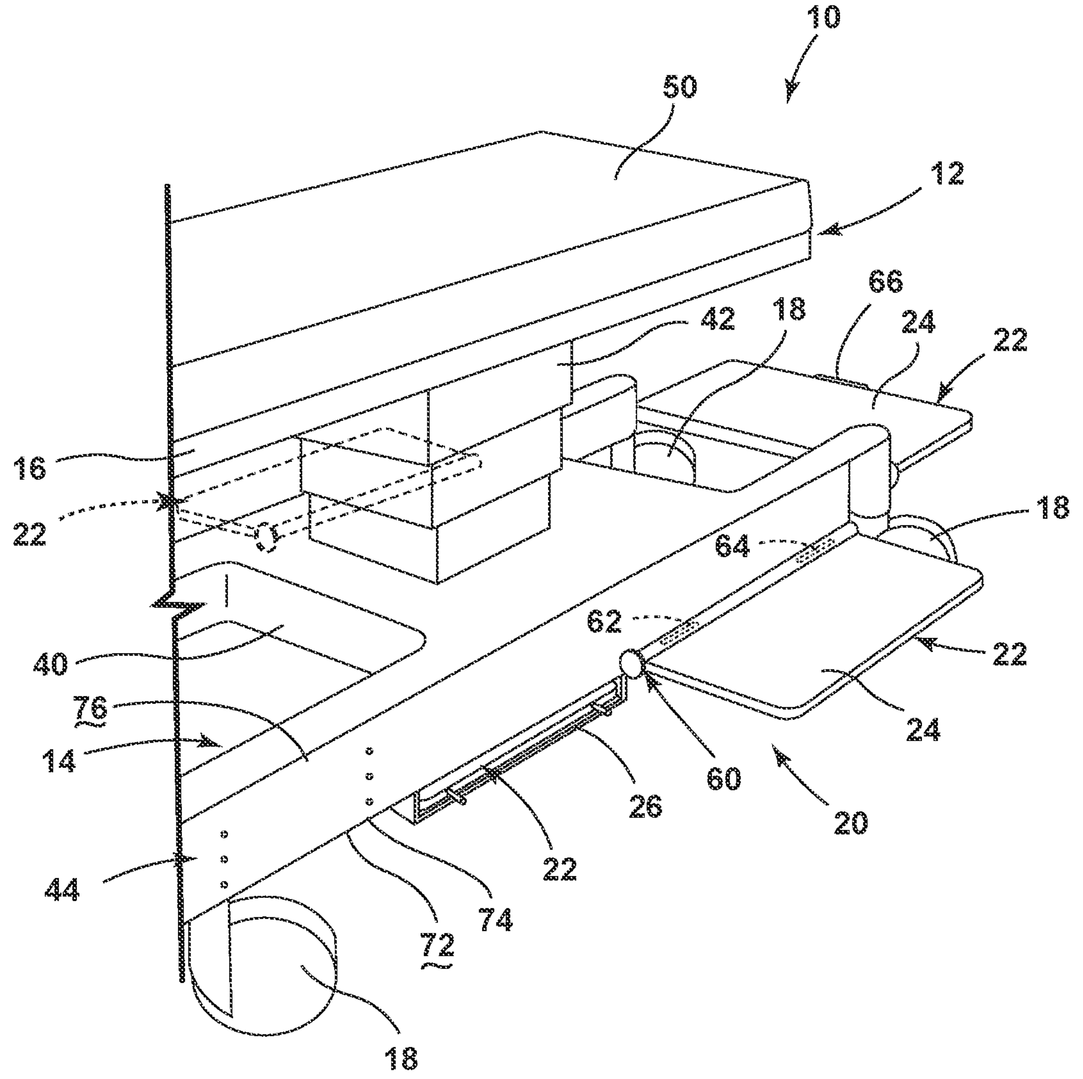
FIG. 2 is a partial side perspective view of a support apparatus including a step assembly with multiple support steps, according to the present disclosure.

Referring to FIGS. 1 and 2, the support apparatus 10 is configured to support a patient thereon and provide space for the caregiver to treat the patient. The step assembly 20 provides one or more locations for supporting the caregiver, increasing access to the patient for the caregiver. In the illustrated configuration, the support apparatus 10 is configured as a stretcher, which has the frame assembly 12 including the base frame 14 and the upper frame 16 coupled to the base frame 14.

The base frame 14 includes a base support 40 and a pedestal 42. The pedestal 42 extends between the upper frame 16 and the base support 40. The pedestal 42 is generally centrally located relative to the upper frame 16. It is also contemplated that more than one pedestal 42 may be included in the support apparatus 10. Support legs **44*a*-44*d*, collectively referred to as support legs 44, are coupled to and extend from the base support 40. The support legs 44 include the wheels or rollers 18 to engage the underlying surface for the support apparatus 10 to be transportable around a medical facility. Generally, two support legs 44*a*, 44*b* extend towards a foot end 46 of the support apparatus 10, and two support legs 44*c*, 44*d* extend toward a head end 48. Other configurations of the support apparatus 10 may be included or utilized with the step assembly 20**, including but not limited to, other stretcher configurations, medical beds, etc.

The upper frame 16 generally forms a deck for supporting a surface assembly 50 thereon. The upper frame 16 is movable relative to the pedestal 42. Accordingly, the upper frame 16 may tilt, rotate, lift, lower, or otherwise move relative to the pedestal 42. Additionally, the upper frame 16 may include multiple segments that may be independently movable relative to one another, allowing movement of different portions of the upper frame 16 separately. The upper frame 16 defines a support surface 52, which is generally configured to support the surface assembly 50 and the patient thereon. The surface assembly 50 may be configured as a mattress, a mattress pad or pads, a coverlet, or other support surfaces.

Referring still to FIGS. 1 and 2, the step assembly 20 includes at least one support step 22, and generally includes multiple support steps 22 operably coupled to the frame assembly 12 at different locations. Each configuration of the support step 22 is configured to support the caregiver when in the deployed position 24 and to be stored in the stowed position 26. In the stowed position 26, the support steps 22 are generally stored with the support apparatus 10. In this way, the support steps 22 are moved toward the frame assembly 12 to be moved out of a space used by the caregiver or caregiving team when treating the patient to prevent the support steps 22 from impeding the caregiver. The support steps 22 are configured to be moved by the caregiver between the deployed and stowed positions 24, 26 when the caregiver desires to use the select support step 22. Accordingly, the support steps 22 may be moved between the deployed position 24 and the stowed position 26 when the support apparatus 10 is stationary and when the support apparatus 10 is moving, such as during a transport process.

Referring still to FIG. 2, the support apparatus 10 is illustrated with multiple support steps 22 in different locations on the support apparatus 10. The support apparatus 10 may include any practicable number of support steps 22 as part of the step assembly 20. The number and configuration of the support steps 22 may depend on the type of support apparatus 10, the unit or department in which the support apparatus 10 is used (e.g., emergency department, surgical suite, transport between departments, etc.), or any other factors for treating the patient. Moreover, many of the configurations of the support step 22 disclosed herein are integrated into the support apparatus 10, being directly or indirectly fixed to the support apparatus 10 when in the stowed position 26, when in the deployed position 24, and when moving therebetween. However, some of the support steps 22 may be at least temporarily removable from the support apparatus 10. Further, support steps 22 may be added or removed to provide the select number of support steps 22 desired by the caregiving team.

The locations of the support steps 22 generally provide increased access to the patient. For example, the support steps 22 positioned on opposing lateral sides of the support apparatus 10 are generally disposed between the head end 48 and a center of the frame assembly 12 to align the support steps 22 with a chest area of the patient. These support steps 22 can be utilized to raise the caregiver to an increased height relative to the patient, which aligns a mid-thigh area of the caregiver with the chest area of the patient. This alignment may be advantageous for providing cardiopulmonary resuscitation (CPR) to the patient.

In another non-limiting example, in certain situations, the caregiver may use a manual resuscitator to ventilate the patient, which often occurs during the transport process while the support apparatus 10 is moving. In conventional configurations, the caregiver walks alongside the support structure while compressing the resuscitator. In the present application, the caregiver may be supported by the support step 22 on the side of the support apparatus 10, to assist the caregiver in ensuring the resuscitator is secured on the patient and reduce a risk of the caregiver stumbling or tripping. The caregiver may focus on the patient and treating the patient, such as compressing the resuscitator, while being carried by the support step 22.

Moreover, in additional non-limiting examples, the support step 22 may be coupled to the head end 48 of the support apparatus 10. This location may provide increased access to a head area of the patient. Further, the support step 22 at the head end 48 can provide a support location for the caregiver using transport handles to guide or steer the support apparatus 10 during the transport process. In various aspects, the support apparatus 10 may be used in a power drive mode, which assists in propelling and driving the support apparatus 10. The caregiver guiding the support apparatus 10 in the power drive mode may stand on the support step 22 at the head end 48 during the transport process for a period of time or the entire time, which may assist the caregiver in guiding the support apparatus 10. The position of the support step 22 may provide increased access to the patient at various locations, including the chest area, the head area, a base or trunk region, a leg area, a foot area, etc.

Referring to FIGS. 3-9, various configurations of the support step 22 and a coupling feature 60 to couple the support step 22 to the frame assembly 12 are illustrated. While a single support step 22 is generally illustrated, it is contemplated that multiple support steps 22 having one or more configurations may be utilized without departing from the teachings herein. In the examples illustrated in FIGS. 3-9, the support steps 22 are coupled to the frame assembly 12 in the stowed position 26, the deployed position 24, and when moving therebetween. Accordingly, the support steps 22 are integrated into the support apparatus 10, remaining coupled to the frame assembly 12 rather than being a separate, removable component.

The support step 22 is configured to be retained in the stowed position 26, retained in the deployed position 24, and efficiently moved between the deployed and stowed positions 24, 26. In various aspects, there may be locking or latching features 62, 64 that secure or retain the support step 22 in the fully deployed position 24 and the fully stowed position 26. In this way, when the support apparatus 10 is moving, the support step 22 is retained in the select position until moved by the caregiver.

Generally, the support step 22 is manually operable, being deployed when desired to be used by the caregiver and remaining stowed when not desired. The support step 22 may include a grasp or handle 66, which may provide a location for the caregiver to quickly grasp when the support step 22 is in the stowed position 26 to move the support step 22 to the deployed position 24. The handle 66 provides convenient and efficient accessibility to the support step 22 when the support step 22 is in the stowed position 26. The caregiver can grasp the handle 66 and provide a force to quickly move the support step 22 to the deployed position 24. The caregiver may apply an opposing force to the handle 66 or the support step 22 to move the support step 22 to the stowed position 26.

Referring still to FIGS. 3-9, typically, the support step 22 forms a single panel for supporting the caregiver. In such examples, the support step 22 is between about 15 inches and about 20 inches in length and between about 8 inches and about 15 inches in width. The support step 22 is a sufficient size to support male and female caregivers and be stowed in an out-of-the-way manner. Additionally or alternatively, in certain aspects, the support step 22 is formed of two panels, which may correspond to one panel for each foot of the caregiver. In such examples, each panel is sized sufficiently to support male and female foot sizes. In a non-limiting example, the combined size of the two panels may be the same size as the single panel. For example, each panel may be between about 5 inches and about 10 inches in length and between about 4 inches and about 15 inches in width.

Figure 3:
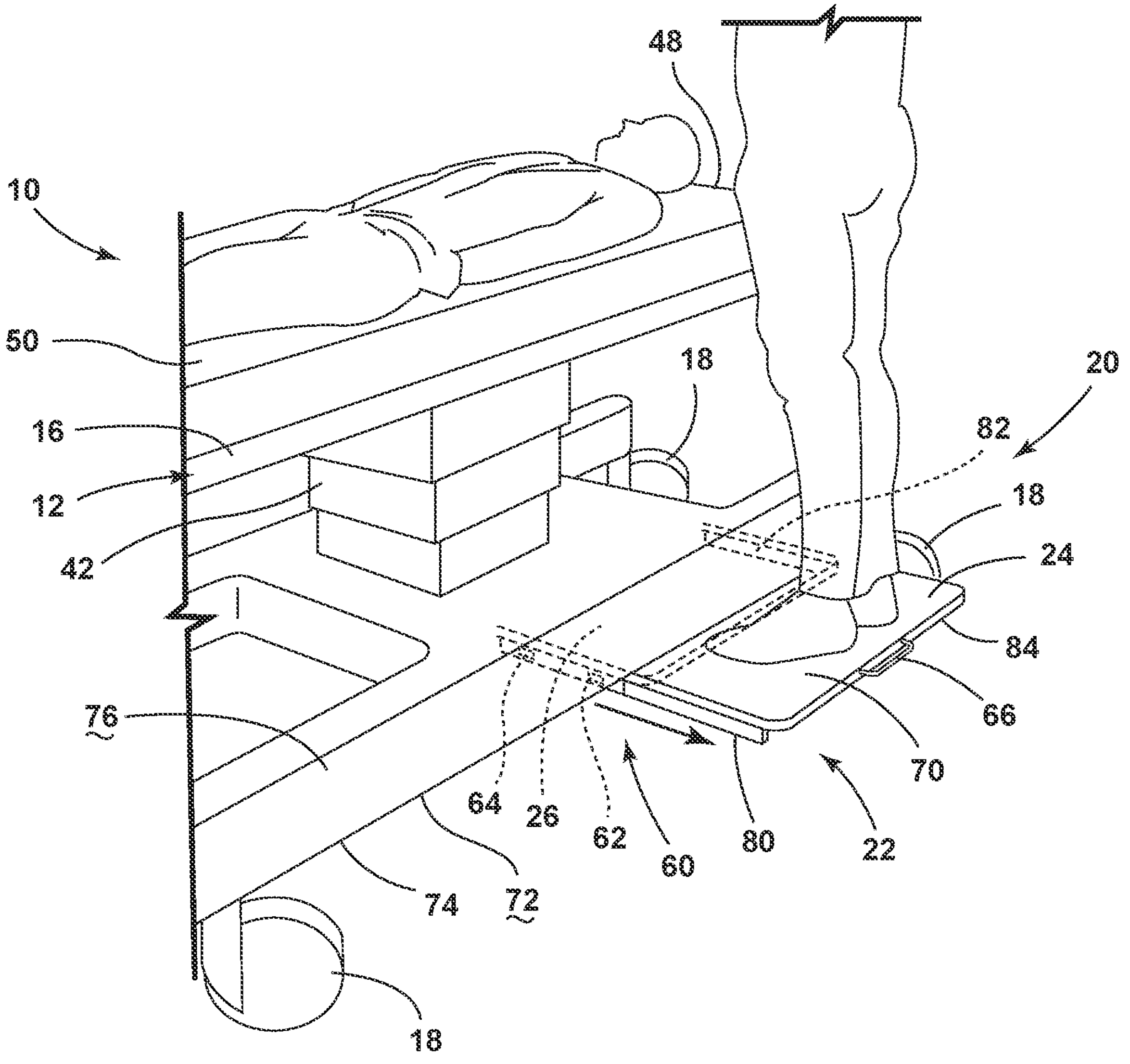
FIG. 3 is a partial side perspective view of a support apparatus including a step assembly with a sliding step, according to the present disclosure.

Referring now to FIG. 3, the support step 22 is configured as a sliding support step 70 formed from a single panel that is configured to support both feet of the caregiver. The sliding step 70 is configured to translate along a horizontal plane when moving between the deployed position 24 and the stowed position 26. When in the stowed position 26, the sliding step 70 is disposed adjacent to a bottom surface 72 of the base frame 14 between the bottom surface 72 and the underlying surface. When stowed, the support step 22 is removed from spaces around the support apparatus 10 that may affect the caregiver and does not substantially impede the caregiver or the functions of the support apparatus 10. Moreover, when in the stowed position 26, the sliding step 70 is disposed substantially or entirely below the base frame 14.

When in the deployed position 24, the sliding step 70 is disposed adjacent to the base frame 14. Generally, the sliding step 70 remains on the same horizontal plane in the deployed position 24 and the stowed position 26. Accordingly, when in the deployed position 24, the support step 22 is disposed proximate to a lower edge 74 defined between the bottom surface 72 and a side surface 76 of the base support 40.

The sliding step 70 illustrated in FIG. 3 is configured to horizontally slide or translate between the deployed and stowed positions 24, 26, which are both generally horizontal positions. The coupling feature 60 is configured as rails 80, 82 coupled to the bottom surface 72 of the base support 40, and the single panel sliding step 70 extends between the rails 80, 82. Generally, two rails 80, 82 support each sliding step 70, but it is contemplated that the sliding step 70 may be coupled to a single rail 80 without departing from the teachings herein. In various aspects, the panel of the sliding step 70 slidably engages the rails 80, 82. In additional or alternative examples, the panel is coupled to rail slides that engage the rails 80, 82 and assist in translating the support step 22 along the rails 80, 82.

The handle 66 on the sliding step 70 may be disposed below the base support 40 and may partially extend beyond the lower edge 74 to be visible to the caregiver standing proximate to the support apparatus 10. The caregiver may apply a pulling force to overcome the latching feature 64 retaining the sliding step 70 in the stowed position 26. The caregiver can pull the handle 66 or an outer edge 84 of the sliding step 70, sliding or moving the sliding step 70 along the rails 80, 82, until the sliding step 70 engages the second latching feature 62 to retain the sliding step 70 in the deployed position 24. To stow the sliding step 70, the caregiver may push the sliding step 70 or the handle 66 along the rails 80, 82 until the sliding step 70 is reengaged with the first latching feature 64. While each support apparatus 10 generally includes multiple support steps 22, which is advantageous for assisting multiple caregivers at a single time, it is contemplated that the rails 80, 82 may extend across the width of the support apparatus 10, such that a single sliding step 70 can be utilized on both sides of the support apparatus 10 without departing from the teachings herein.

Figure 4:
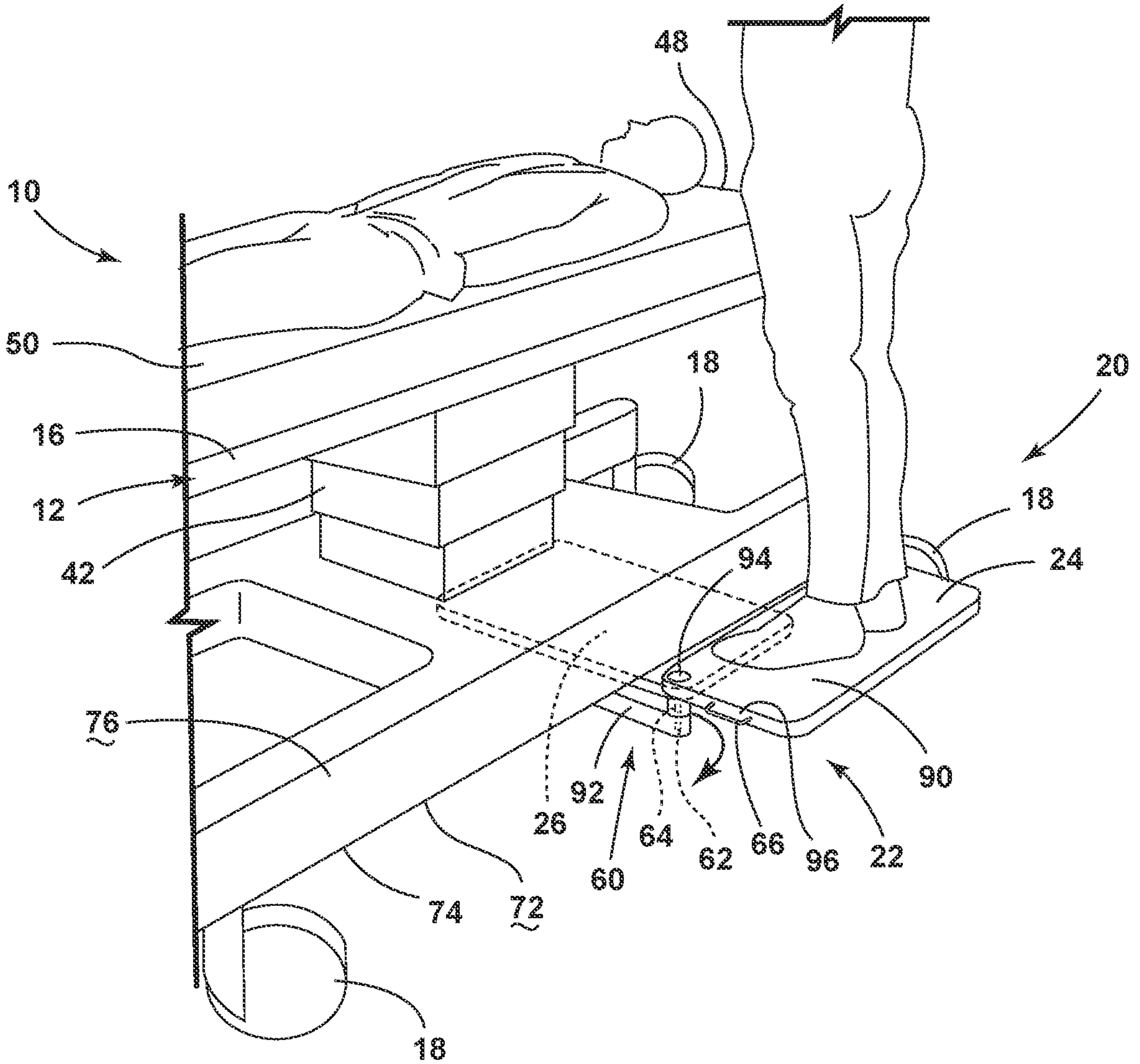
FIG. 4 is a partial side perspective view of a support apparatus including a step assembly with a rotating step, according to the present disclosure.

With reference now to FIG. 4, the support step 22 is configured as a rotating support step 90, and the coupling feature 60 is configured as a pivot arm 92 coupled to the base frame 14. The pivot arm 92 is coupled to the bottom surface 72 of the base support 40 and extends beyond the side surface 76. It is contemplated that the pivot arm 92 may be coupled to another surface of the base support 40 without departing from the teachings herein. Generally, the pivot arm 92 extends a distance from the side surface 76 sufficient to allow the rotating step 90 to be fully adjacent to the side surface 76 of the base support 40 when in the deployed position 24 and minimize the protrusion that could impede the caregiver when the rotating step 90 is in the stowed position 26.

The rotating step 90 is configured to rotate along the horizontal plane between the stowed position 26 adjacent to the bottom surface 72 of the base support 40 and the deployed position 24 adjacent to the side surface 76 of the base support 40. Accordingly, the rotating step 90 is rotatably coupled to the pivot arm 92 at a pivot location 94, which is generally a distal end of the pivot arm 92. The rotating step 90 is configured to rotate about 90 degrees about the pivot location 94 between the stowed position 26 and the deployed position 24, which are both generally horizontal positions. The rotating step 90 is generally configured to extend in a side-to-side, lateral direction along a width of the base support 40 when in the stowed position 26, and in a longitudinal direction between the head end 48 and the foot end 46 when in the deployed position 24. The rotating step 90 generally rotates about a vertical rotational axis between the stowed position 26 and the deployed position 24. The pivot arm 92 may include the latching features 62, 64 configured to retain the rotating step 90 in the fully deployed and fully stowed positions 24, 26, respectively.

In various examples, the pivot arm 92 is fixed relative to the base support 40. In such examples, the pivot arm 92 protrudes beyond the side surface 76 of the base support 40, and the pivot location 94 remains fixed relative to the base support 40. Accordingly, the rotating step 90 extends substantially beneath the base support 40 when in the stowed position 26 and extends beyond the side surface 76 to the pivot location 94. A side edge 96 of the rotating step 90 can remain exposed adjacent to the base support 40, which may be used as the grasping location to move the support step 22. Alternatively, the handle 66 may be coupled to the side edge 96.

In additional or alternative configurations, the pivot arm 92 is configured to move relative to the base support 40. For example, the pivot arm 92 may engage a rail that allows the pivot arm 92 to slide relative to the base support 40. In such examples, when the rotating step 90 is in the stowed position 26, the pivot arm 92 may slide along the bottom surface 72 to be fully disposed beneath the base support 40. The pivot arm 92 is then configured to slide outward and the rotating step 90 is rotated to the deployed position 24. This configuration may use a single rail that is shorter in length than the rails 80, 82 described with respect to FIG. 3.

Referring still to FIG. 4, in additional non-limiting examples, the pivot arm 92 may be configured to telescope, retracting and extending relative to the base support 40. In such examples, when the rotating step 90 is rotated to the stowed position 26, the pivot arm 92 may be retracted to adjust the pivot arm 92 below the base support 40. The pivot arm 92 may then be elongated to protrude relative to the base support 40 and the support step 22 rotated to the deployed position 24. The movement of the pivot arm 92 may be advantageous for reducing any projection from the side of the base support 40.

Figure 5:
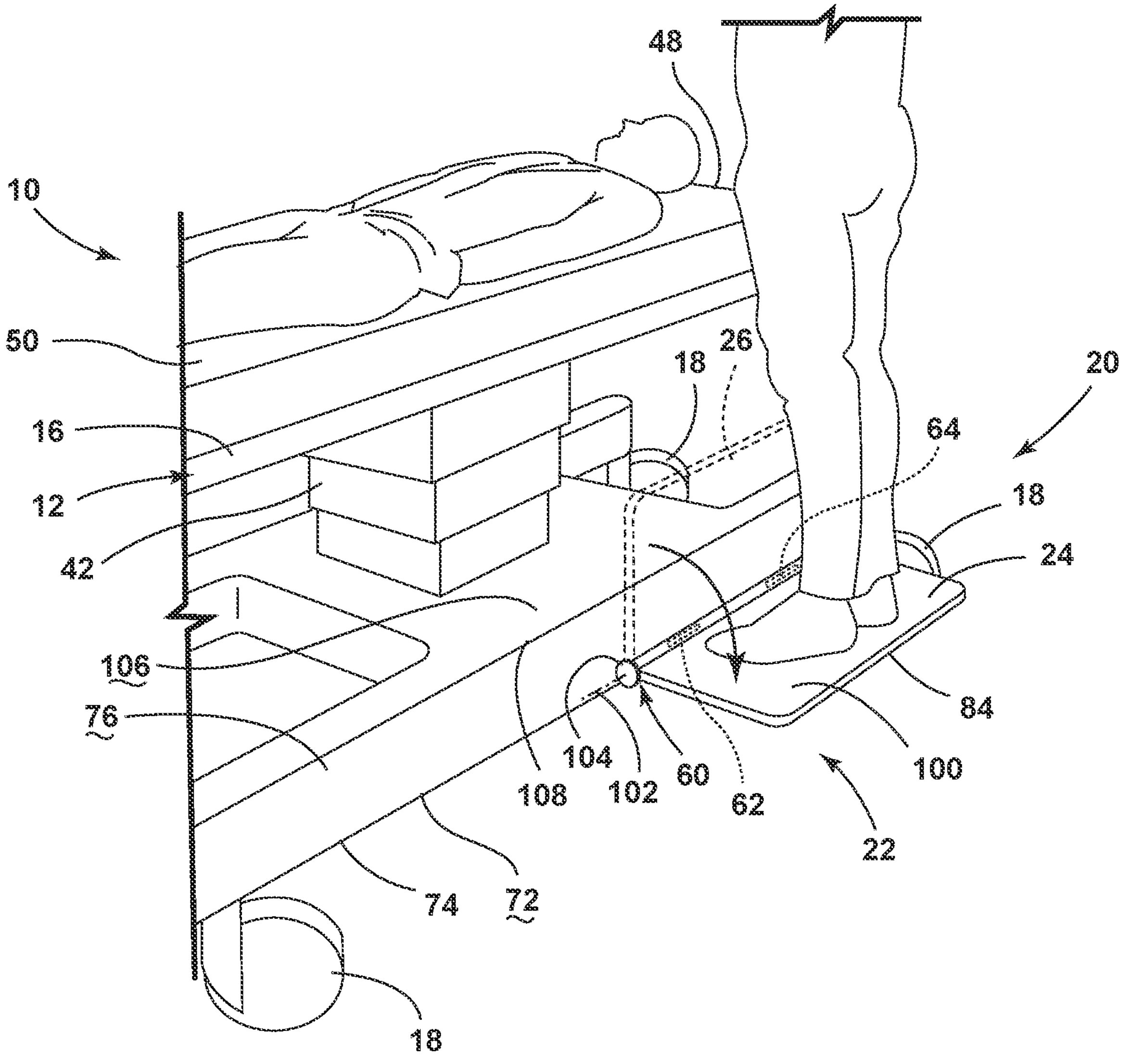
FIG. 5 is a partial side perspective view of a support apparatus including a step assembly with a pivoting step, according to the present disclosure.

Referring to FIG. 5, the support step 22 may be configured as a pivoting support step 100 that rotates about a horizontal rotational axis 102 between the stowed position 26 and the deployed position 24. In such examples, the coupling feature 60 is configured as a hinge or a pivot assembly 104 coupled to the base frame 14. In the illustrated example, the pivot assembly 104 is coupled proximate to the lower edge 74 of the base support 40 defined between the side surface 76 and the bottom surface 72.

The pivoting step 100 is configured to rotate about 90 degrees between the deployed position 24, which is a generally horizontal position, and the stowed position 26, which is a generally vertical position. When in the deployed position 24, the pivoting step 100 extends outward from the side surface 76 of the base support 40. When in the stowed position 26, the pivoting step 100 is configured to abut the side surface 76 of the base frame 14 and extend toward the upper frame 16. The pivoting step 100 may remain a consistent size, extending beyond an upper surface 106 of the base support 40 when in the stowed position 26.

Additionally or alternatively, the pivoting step 100 may be configured to retract and expand. In such examples, the pivoting step 100 is configured to expand to provide the surface on which the caregiver can be supported and retract to reduce the size of the pivoting step 100 when in the stowed position 26 to minimize the space utilized by the pivoting step 100. The pivoting step 100 may be configured to retract to slightly protrude or align with the upper surface 106 of the base support 40 when stowed.

According to various aspects, the pivoting step 100 may be coupled proximate to an upper edge 108 of the base support 40 defined between the side surface 76 and the upper surface 106 of the base support 40. In such examples, the support step 22 extends horizontally from the side surface 76 of the base support 40 at a greater height relative to the underlying surface compared to when the pivoting step 100 is coupled proximate to the lower edge 74. This may be advantageous for shorter caregivers. The step assembly 20 may include both the pivoting steps 100 coupled proximate to the lower edge 74 and the upper edge 108 to provide two heights for different caregivers.

For the pivoting step 100 coupled proximate to the upper edge 108, the stowed position 26 may be a vertical position, extending toward the upper frame 16. Additionally or alternatively, the support step 22 may rotate about 180 degrees to abut or be disposed adjacent to the upper surface 106 of the base frame 14. In such examples, the stowed position 26 may be a generally horizontal position, extending over the upper surface 106 of the base support 40.

Figure 6:
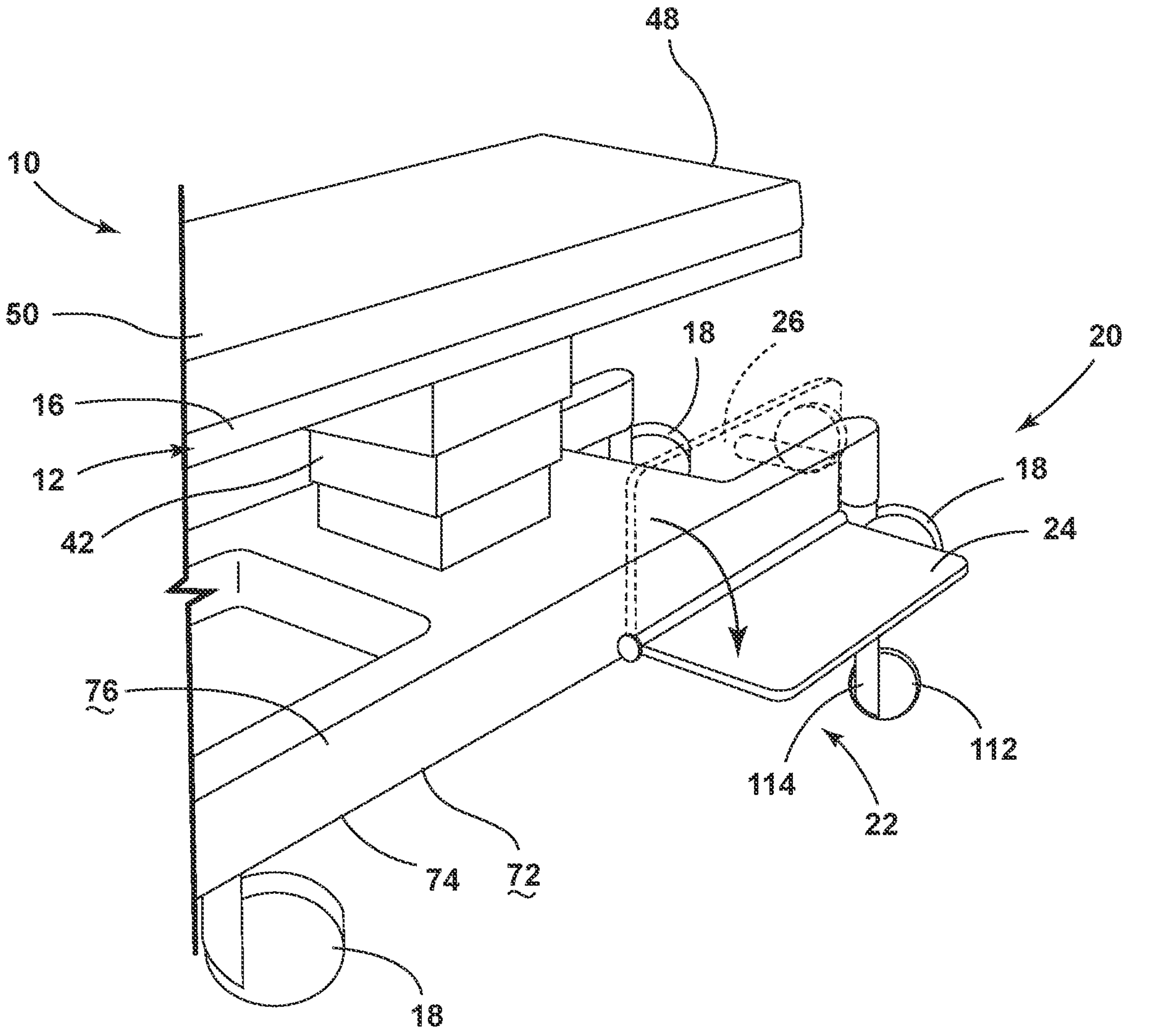
FIG. 6 is a partial side perspective view of a support apparatus including a step assembly with a pivoting step that includes a caster, according to the present disclosure.

Referring to FIG. 6, the support step 22 may have a castor 112 coupled to one side thereof, which is configured to engage the underlying surface when the support step 22 is in the deployed position 24. While illustrated on the pivoting support step 100 that rotates about the horizontal axis 102, the castor 112 may be coupled to any and/or all of the configurations of the support step 22 disclosed herein. The castor 112 may provide additional support and stability for the support step 22, which may be advantageous when the caregiver is supported on the support step 22. Additionally, the castor 112 also translates across the underlying surface similar to the rollers 18 and can assist in the transport of the support apparatus 10.

In various examples, the castor 112 is coupled to the support step 22 via a support post 114. The support post 114 may be removable from the support step 22 and stowed on the support apparatus 10, such as in a storage cavity, when the support step 22 is in the stowed position 26. The removable castor 112 may be advantageous to reduce projections extending outward from the support step 22 when the support step 22 is in the stowed position 26.

Figure 7:
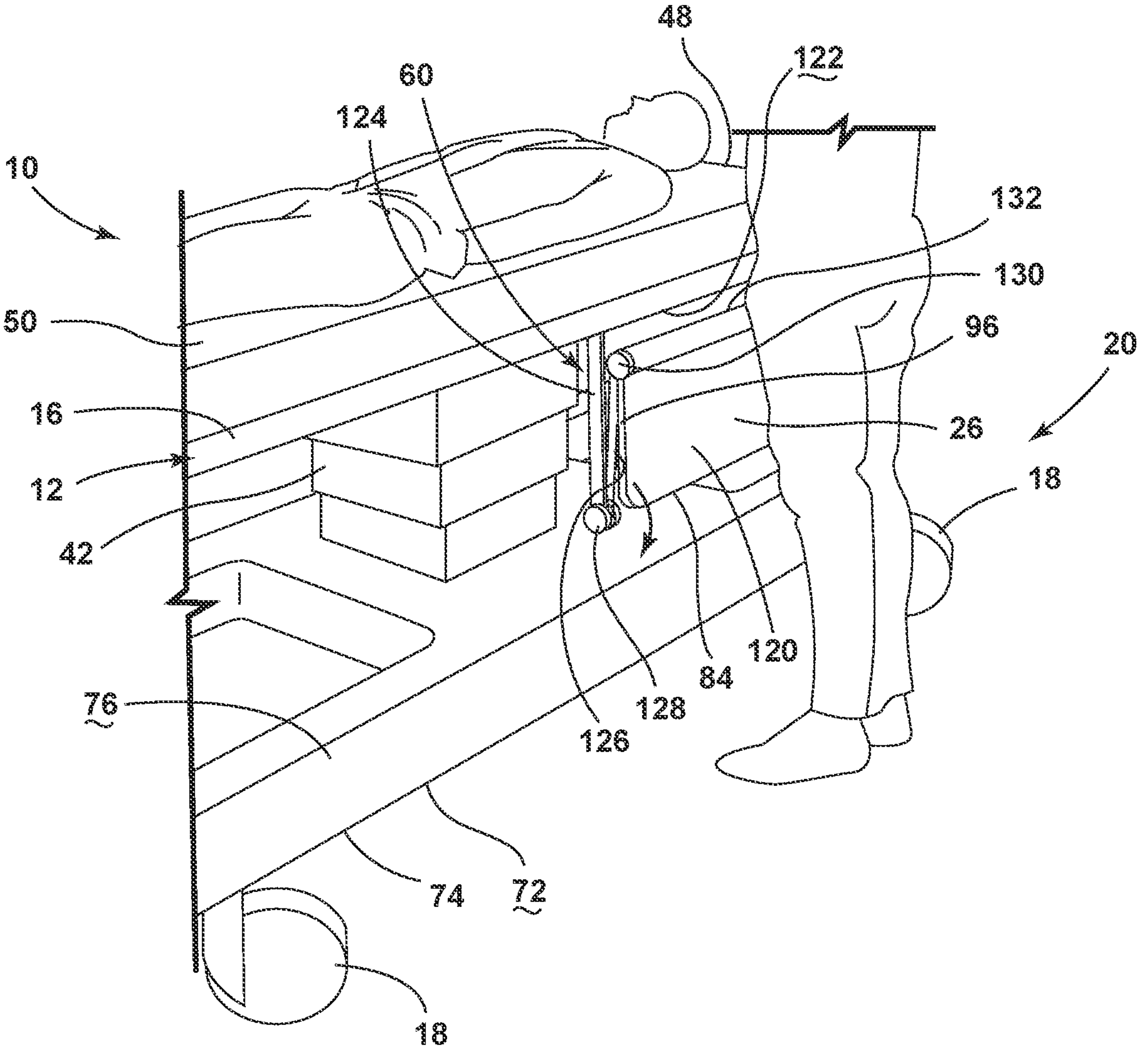
FIG. 7 is a partial side perspective view of a support apparatus including a step assembly with a vertically adjusting step in a stowed position, according to the present disclosure.
Figure 8:
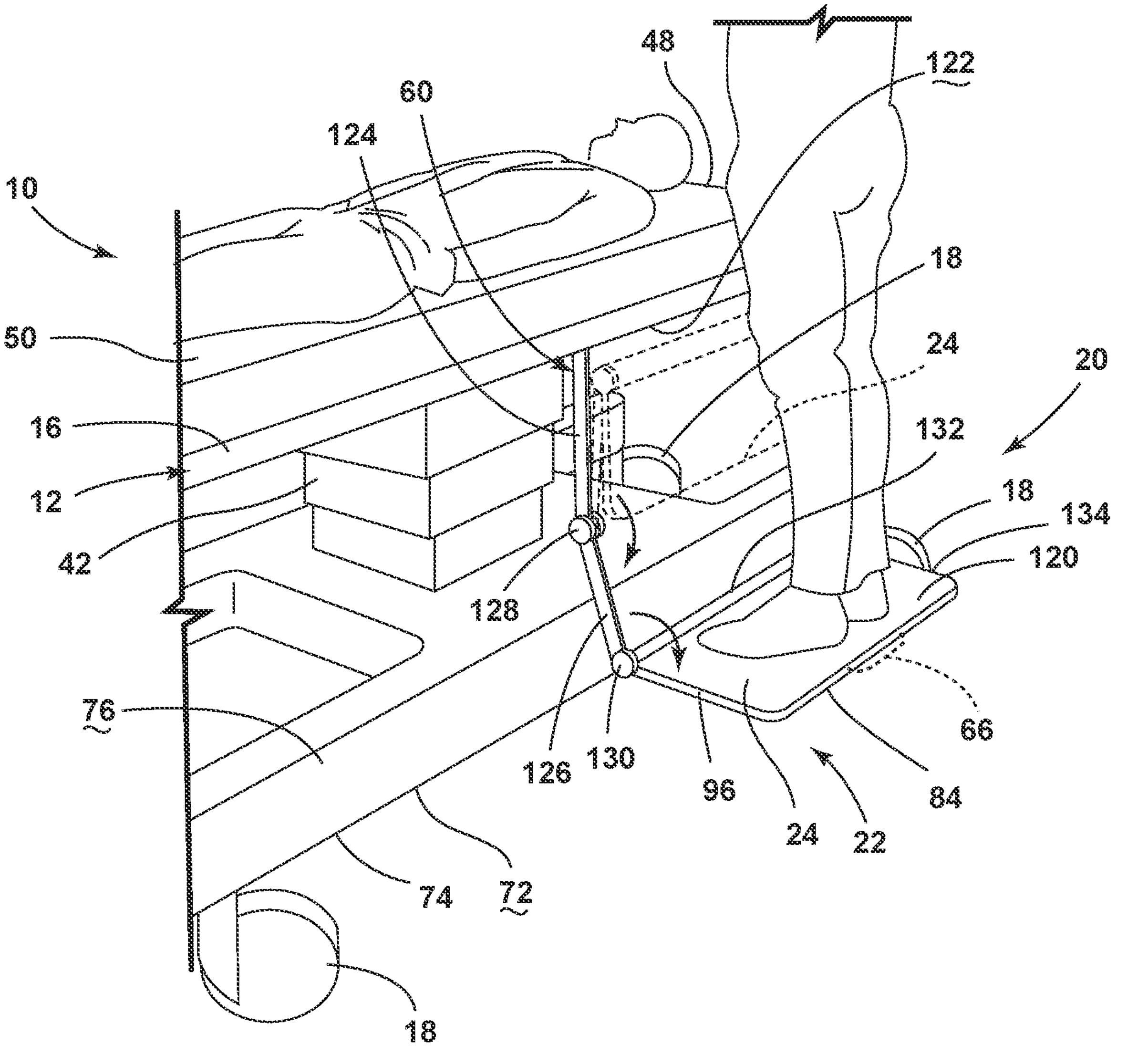
FIG. 8 is a partial side perspective view of a support apparatus including a step assembly with a vertically adjusting step in a deployed position, according to the present disclosure.

With reference now to FIGS. 7 and 8, the support step 22 may be configured as a vertically adjusting support step 120 coupled to the upper frame 16 of the frame assembly 12 and operable between the stowed position 26 (FIG. 7) and the deployed position 24 (FIG. 8). The stowed position 26 is a generally vertical position proximate to a lower surface 122 of the upper frame 16, while the deployed position 24 is a generally horizontal position disposed proximate to the side surface 76 of the base frame 14. The vertically adjusting step 120 is configured to move vertically between the stowed position 26 and the deployed position 24. Further, the vertically adjusting step 120 may move horizontally as well, moving outward from between the upper frame 16 and the base frame 14 to be to a side of the base frame 14.

The coupling feature 60 is configured as first and second support arms 124, 126. The first support arm 124 is coupled to the lower surface 122 of the upper frame 16. The second support arm 126 is rotatably coupled to the first support arm 124, and the support step 22 is rotatably coupled to the second support arm 126 on an opposing end relative to the first support arm 124. The first support arm 124 extends between the lower surface 122 of the upper frame 16 and the upper surface 106 of the base support 40. Generally, the first support arm 124 is fixed relative to the upper frame 16. However, it is contemplated that the first support arm 124 may be rotatably coupled to the upper frame 16 to further stow the vertically adjusting step 120 adjacent to the lower surface 122 of the upper frame 16 without departing from the teachings herein. In such examples, the rotation of the first support arm 124 may allow the vertically adjusting step 120 to be folded to extend generally parallel to the upper frame 16 proximate to the lower surface 122 thereof. The rotation may also allow for stowing the vertically adjusting step 120 proximate to the upper surface 106 of the base frame 14.

When in the stowed position 26, the second support arm 126 extends generally parallel or at an acute angle relative to the first support arm 124. The second support arm 126 extends from a joint 128 engaging the first support arm 124 and toward the lower surface 122 of the upper frame 16. Further, when in the stowed position 26, the vertically adjusting step 120 extends from proximate the lower surface 122 to a location proximate to the joint 128 between the support arms 124, 126. In this way, the vertically adjusting step 120 and the support arms 124, 126 are disposed substantially or entirely between the lower surface 122 of the upper frame 16 and the upper surface 106 of the base support 40. Accordingly, the step assembly 20 does not extend substantially outward to impinge space utilized by the caregiver.

When adjusting to the deployed position 24, the second support arm 126 rotates outward away from the first support arm 124, and the vertically adjusting step 120 rotates to the horizontal position proximate to the base support 40. A joint 130 between the vertically adjusting step 120 and the second support arm 126 may be disposed adjacent to or abut the side surface 76 of the base support 40. The abutting relationship may be advantageous for providing additional stability to the vertically adjusting step 120.

In FIGS. 7 and 8, one set of the support arms 124, 126 is illustrated. The vertically adjusting step 120 may be supported by one set of the support arms 124, 126, generally being supported on one side edge 96 or an inner edge 132 of the vertically adjusting step 120. Alternatively, the vertically adjusting step 120 may be supported by two sets of support arms 124, 126 on each opposing side edge 96, 134 or the on inner edge 132.

The caregiver may apply a pulling or downward force on the vertically adjusting step 120 or the handle 66 to move the vertically adjusting step 120 to the deployed position 24. The support arms 124, 126 generally include the latching features 62 to retain the second support arm 126 and the support step 22 in the deployed position 24. It is also contemplated that the support arms 124, 126 and/or the joint 130 may include a locking feature that can support the vertically adjusting step 120 at different heights relative to the underlying surface, which may be advantageous for caregivers of different heights.

To return the vertically adjusting step 120 to the stowed position 26, the caregiver may apply a pulling or upward force on the vertically adjusting step 120 or the handle 66. The caregiver can continue to move the second support arm 126 and the vertically adjusting step 120 until additional latching features 64 are engaged to retain the second support arm 126 and the vertically adjusting step 120 in the stowed position 26.

Figure 9:
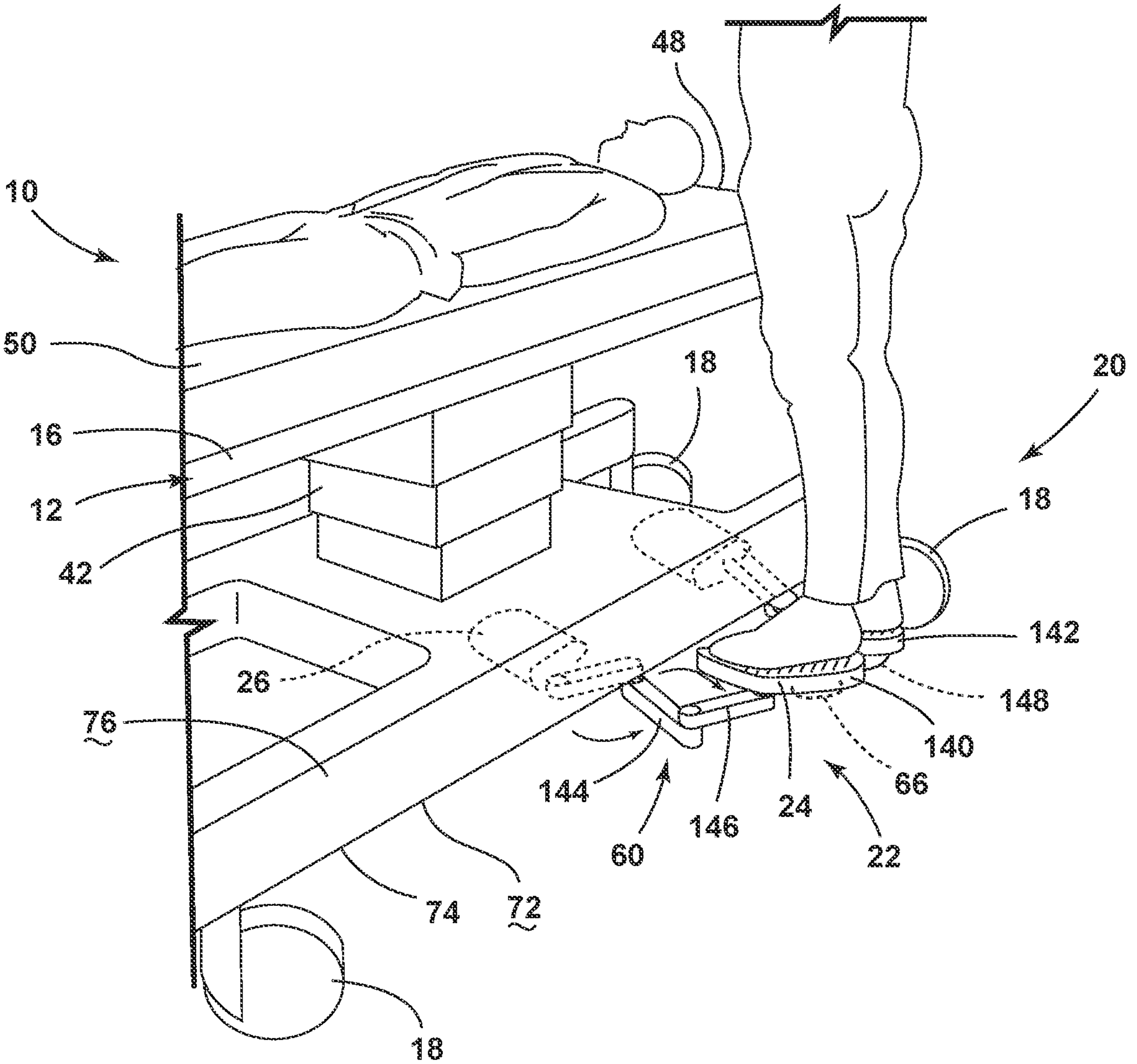
FIG. 9 is a partial side perspective view of a support apparatus including a step assembly with foot pedals, according to the present disclosure.

With reference now to FIG. 9, the support step 22 may be configured as foot pedals 140, 142 each coupled to the frame assembly 12 via the coupling feature 60, which is configured as sets of first and second support links 144, 146. Accordingly, each foot pedal 140, 142 is coupled to the base frame 14 by the respective first and second support links 144, 146 that operate similarly and are generally mirror images of one another (e.g., one of each of the first and second support links 144, 146 for each pedal 140, 142). The foot pedals 140, 142 may also be the same configuration or mirror images of one another. Each foot pedal 140, 142 may be sized and shaped to support male and female caregivers of various sizes. For example, each foot pedal 140, 142 may be sized and shaped to support a male caregiver in the 95th percentile.

The foot pedals 140, 142 are configured to rotate and translate along the horizontal plane, remaining at a same general height relative to the underlying surface when in the stowed position 26 and the deployed position 24, which are generally horizontal positions. The first support links 144 are rotatably coupled to the bottom surface 72 of the base support 40 and the second support links 146. The foot pedals 140, 142 are coupled to distal ends of the second support links 146. The foot pedals 140, 142 may be fixed to the second support links 146 or alternatively may be rotatably coupled to the second support links 146. The rotatable configuration of the foot pedals 140, 142 may be advantageous for positioning the foot pedals 140, 142 at an ergonomic or personalized position for the caregiver.

In the stowed position 26, the foot pedals 140, 142 are configured to be disposed at least partially between the bottom surface 72 of the base support 40 and the underlying surface. Accordingly, both support links 144, 146 rotate to move the foot pedals 140, 142 under the base support 40. In the deployed position 24, the foot pedals 140, 142 are configured to be disposed adjacent to the side surface 76 of the base support 40. The support links 144, 146 may be configured to support the foot pedals 140, 142 in multiple positions relative to the side surface 76, such as abutting the side surface 76 or spaced various distances from the side surface 76. In various aspects, the foot pedals 140, 142 may be independently movable relative to one another between the deployed and stowed positions 24, 26. In this way, the caregiver may move the first foot pedal 140 to the deployed position 24 without moving the second foot pedal 142.

Additionally or alternatively, the first and second foot pedals 140, 142 may be coupled together by a link member 148, which may be a flexible or rigid structure. When the link member 148 is flexible or deformable, the foot pedals 140, 142 may be moved together between the deployed and stowed positions 24, 26 and also slightly independently adjustable relative to one another. This configuration allows the foot pedals 140, 142 to be moved together in an efficient manner and then positioned relative to one another in a manner comfortable for the caregiver. When the link member 148 is rigid, the relationship between the foot pedals 140, 142 remains consistent. The linking of the foot pedals 140, 142 may be advantageous for deploying both foot pedals 140, 142 in an efficient manner, particularly during the transport process. It is also contemplated that the link member 148 may be added and removed to at least one of the foot pedals 140, 142 to couple and separate the foot pedals 140, 142, providing increased flexibility to the step assembly 20.

The foot pedals 140, 142 may each include the handle 66 or grasping location, or alternatively, the link member 148 may include or form the handle 66. The caregiver may pull the handle 66 or handles 66 to rotate the support links 144, 146 and move the foot pedals 140, 142 to the deployed position 24. The support links 144, 146 may have latching features 62 to retain the support links 144, 146 and the foot pedals 140, 142 in the deployed position 24. The caregiver may then push the link member 148 or foot pedals 140, 142 to move the foot pedals 140, 142 to the stowed position 26, engaging additional latching features 64 to retain the foot pedals 140, 142 in the stowed position 26. The foot pedals 140, 142 may be considered a low-profile configuration of the support step 22.

Referring again to FIG. 1-9, the support step 22 or support steps 22 may be integrated with the support apparatus 10. Accordingly, the support steps 22 may remain connected or coupled, either directly or indirectly, to the support apparatus 10 when in the stowed position 26, when in the deployed position 24, and when moving between the deployed and stowed positions 24, 26. The support steps 22 remain as part of the support apparatus 10 to increase efficiency in the transport process and overall care of the patient.

Figure 10:
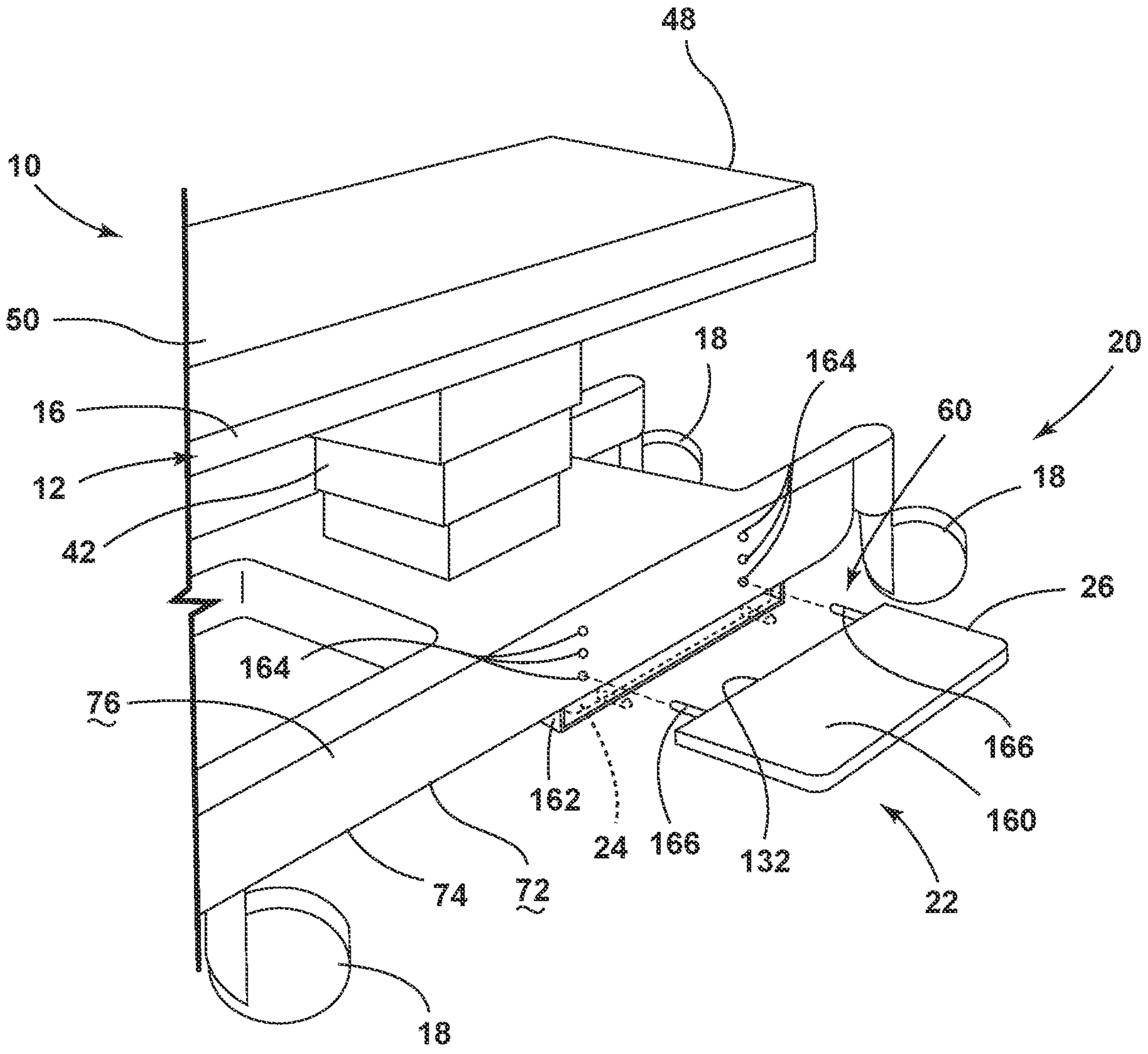
FIG. 10 is a partial side perspective view of a support apparatus including a step assembly with a storage feature and a removable step, according to the present disclosure.

Referring now to FIG. 10, the support step 22 may be a separable component stored with the support apparatus 10 when in the stowed position 26 and selectively coupled with the frame assembly 12 in the deployed position 24. Accordingly, the support step 22 may be configured as a selectively removable support step 160. The support apparatus 10 includes a storage feature 162, which is illustrated as being coupled to the bottom surface 72 of the base support 40 and may be in any practicable location on the support apparatus 10. In the illustrated example, the storage feature 162 and the base support 40 define a storage space for storing the support step 22 in the stowed position 26. The removable step 160 is illustrated as the single panel configuration but may be two or more panels without departing from the teachings herein.

The base frame 14, such as the base support 40 or the legs 44, defines a plurality of receiving apertures 164, and the removable step 160 includes posts 166 configured to be disposed within the receiving apertures 164 to couple the removable step 160 to the base frame 14 in the deployed position 24 at different positions or locations. It is also contemplated that one post 166 may be utilized. The engagement between the posts 166 and the receiving apertures 164 may form the coupling feature 60. The base support 40 and the posts 166 may have interlocking, mating, or otherwise engageable features for retaining the posts 166 in the receiving apertures 164 and, consequently, the removable step 160 in the deployed position 24. The receiving apertures 164 are generally defined at multiple heights or levels. In this way, the caregiver may choose which height to place the removable step 160 in the deployed position 24, which may allow caregivers of different heights to have similar access to the support apparatus 10 and the patient thereon.

The removable step 160 may have the handle 66 or the posts 166 may operate as a grasping location for the removable step 160 in the stowed position 26. The caregiver may remove the removable step 160 from the storage feature 162 and insert the posts 166 into the receiving apertures 164 at the selected height. The caregiver can pull the removable step 160 to remove the posts 166 from the receiving apertures 164 and return the removable step 160 to the stowed position 26 in the storage feature 162. In various aspects, the storage feature 162 may have the latching feature 64, a strap, or other retaining features to hold the removable step 160 within the storage feature 162.

Figure 11:
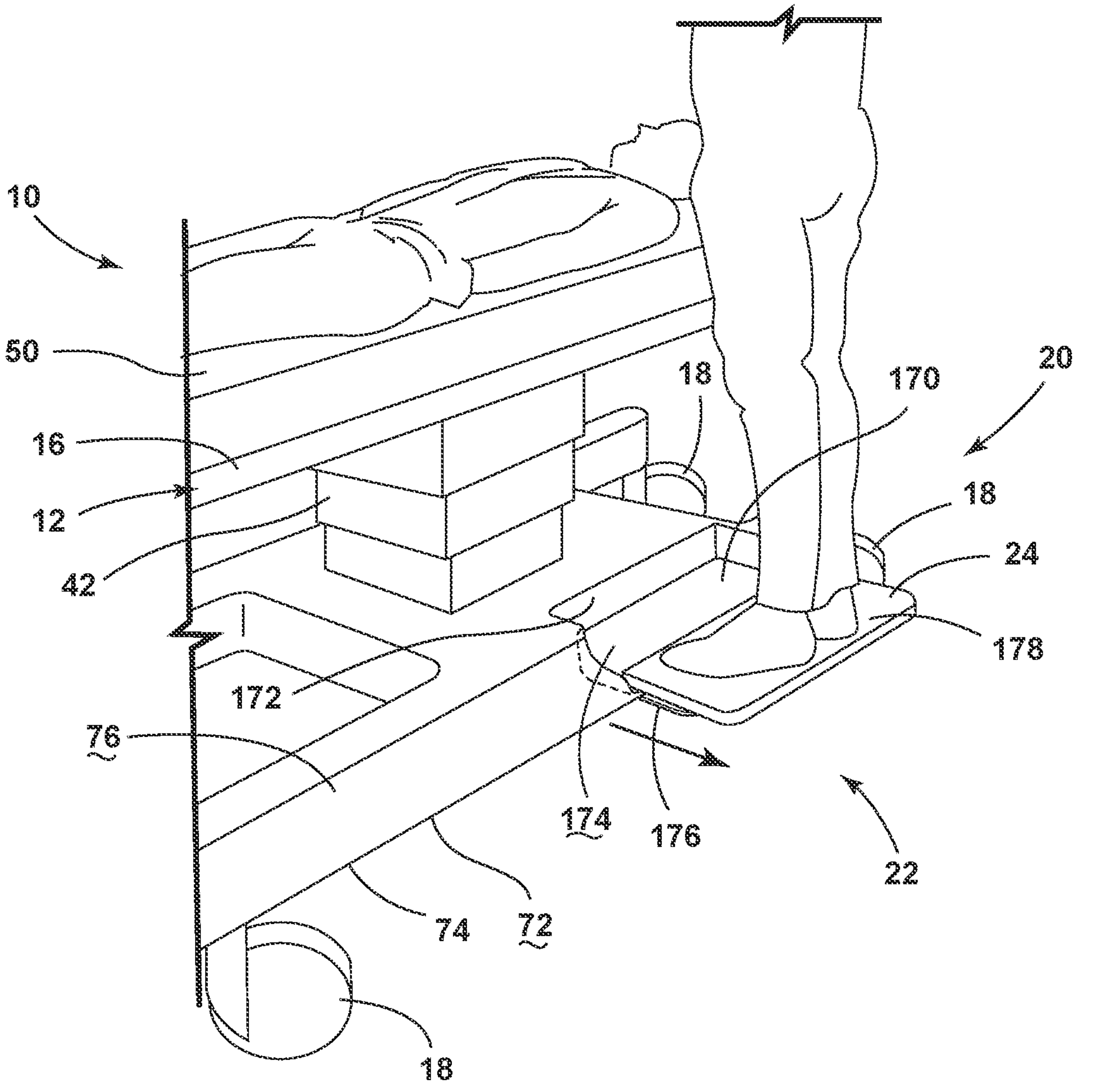
FIG. 11 is a partial side perspective view of a support apparatus that defines a recess to form a support step and a sliding step panel disposed in the recess, according to the present disclosure.

Referring to FIG. 11, the support step 22 may be configured as an integrated recessed step 170, where the base frame 14 may define a recess 172 that forms at least part of the recessed step 170. The recess 172 is generally defined in one or more locations on the base frame 14. A lower recessed surface 174 defined in the base frame 14 may provide at least a portion of the recessed step 170 for the patient or the caregiver. The base frame 14 may define a protruding lip 176, which forms a portion of or extends the lower recessed surface 174, to provide an increased space for the caregiver to stand.

Additionally or alternatively, the support apparatus 10 may include a step panel 178 that can be disposed on the lower recessed surface 174 and moved to expand the recessed step 170 formed by the lower recessed surface 174. In such examples, the step panel 178 may be moved further into the recess 172 in the stowed position 26 and extend partially out of the recess 172 in the deployed position 24. The step panel 178 may be supported on the protruding lip 176 and form an extension of the protruding lip 176. The step panel 178 may be slid, pivoted, rotated, or otherwise moved between the stowed position 26 and the deployed position 24. The step panel 178 may remain engaged with the base frame 14 (e.g., rails, pivots, hinges, etc.). It is also contemplated that the step panel 178 may be removed and the lower recessed surface 174 and the protruding lip 176 form the recessed step 170, which is a static step.

Figure 12:
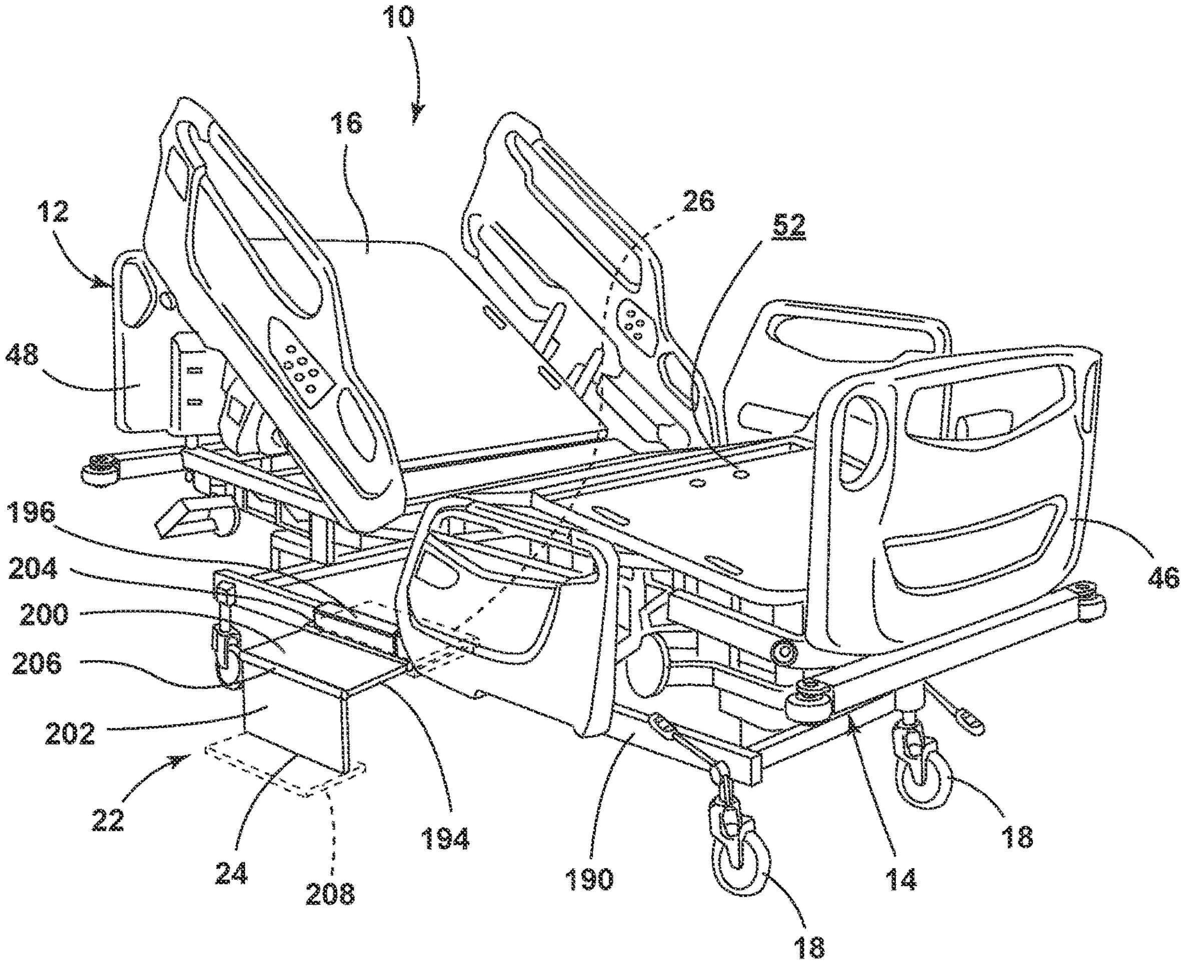
FIG. 12 is a side perspective view of a support apparatus including a step assembly with a folding step, according to the present disclosure.
Figure 13:
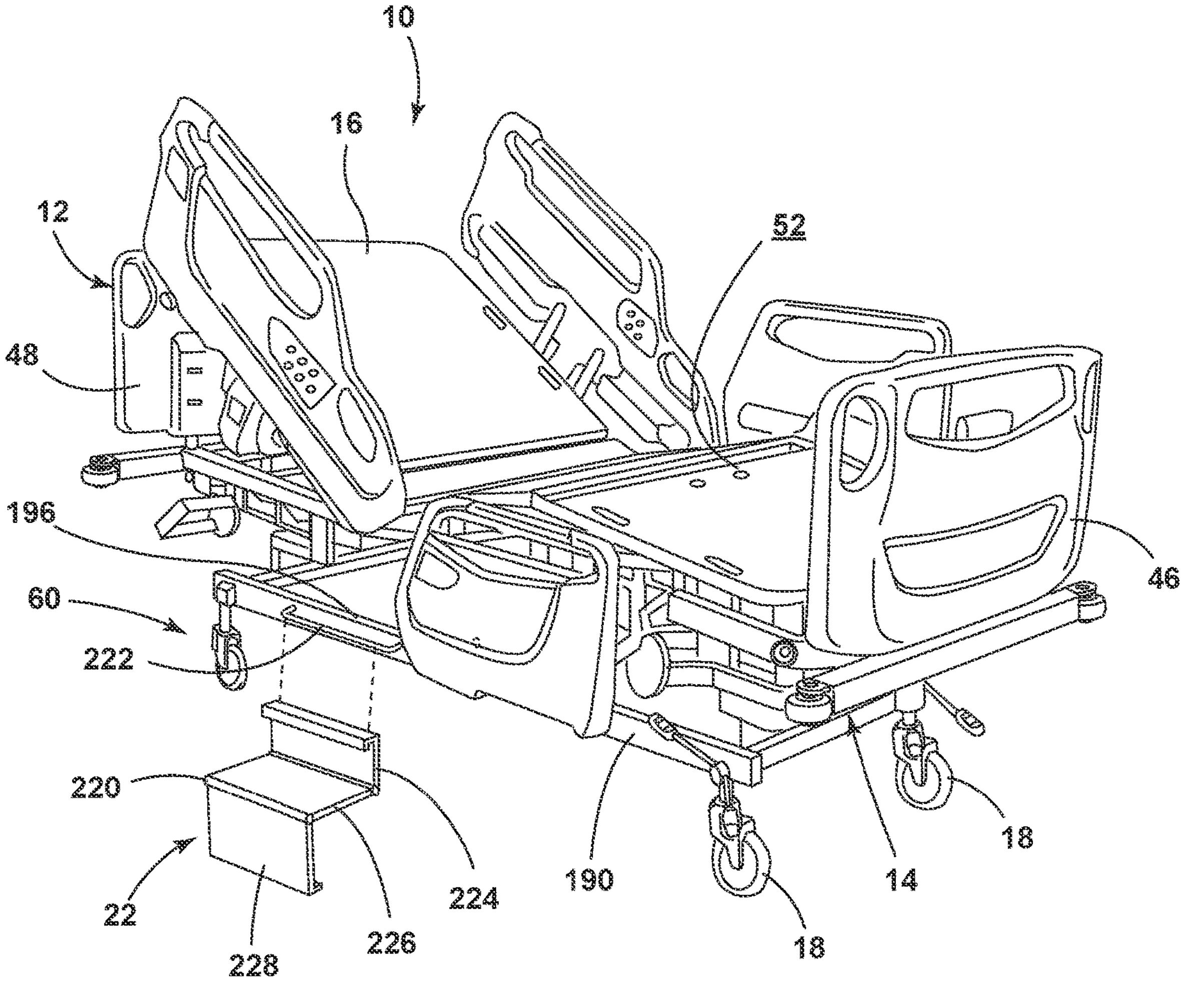
FIG. 13 is a partial side perspective view of a support apparatus including a step assembly with a hanging step, according to the present disclosure.

Referring to FIGS. 12 and 13, the support apparatus 10 is illustrated as a medical bed, having the base frame 14 with the rollers 18 and the upper frame 16 adjustable relative to the base frame 14. In the illustrated configurations, the base frame 14 includes frame members 190 that are coupled together forming an interior space below the upper frame 16. The support steps 22 may be coupled to one or more of the frame members 190. As illustrated, a single support step 22 is illustrated on the support apparatus 10, however, as disclosed herein, multiple support steps 22 may be coupled to the support apparatus 10 in multiple locations.

Referring still to FIG. 12, the support step 22 is illustrated as a folding step 194, and the coupling feature 60 is configured as a bracket 196. In various examples, the bracket 196 is U-shaped to hook the folding step 194 on the frame member 190 or elsewhere on the base frame 14. In such examples, the folding step 194 may be selectively added and removed from the support apparatus 10 as desired by the caregiver. Further, this configuration may allow the caregiver to move the folding step 194 to multiple locations on the support apparatus 10. When the folding step 194 includes the U-shaped bracket 196, the folding step 194 may be uncoupled from the frame member 190, folded, and stored in the storage feature 162 (FIG. 162), which may be coupled with the frame member 190 and generally positioned within the interior space and/or between the frame members 190 and the underlying surface. It is contemplated that the stretcher configuration of the support apparatus 10 may include a bar for the U-shaped bracket 196 to engage.

Additionally or alternatively, the bracket 196 may be circular, extending about the frame member 190 and fixedly coupling the folding step 194 to the base frame 14. In such examples, the folding step 194 is integrated into the support apparatus 10. The folding step 194 may be maintained at a select position on the base frame 14, or alternatively may be configured to slide along the respective frame member 190 when the bracket 196 is configured to slide relative to the frame member 190. This configuration may allow the caregiver to select the precise position of the folding step 194 relative to the frame member 190. In movable examples of the folding step 194, the bracket 196 may include stoppers for retaining the bracket 196 and the folding step 194 in the selected position on the base frame 14.

The folding step 194 generally includes at least two support panels 200, 202. The first support panel 200 is coupled to the bracket 196 via a first hinge assembly 204, and the second support panel 202 is coupled to the first support panel 200 via a second hinge assembly 206. In the deployed position 24, the first support panel 200 extends outward from the base frame 14, generally parallel to the underlying surface to provide a standing location for the caregiver or patient. The second support panel 202 extends from the first support panel 200 to the underlying surface, providing additional support for the folding step 194.

In certain aspects, the bracket 196 may be omitted. In such examples, the folding step 194 may be coupled to the frame member 190 via the first hinge assembly 204. In such examples, the folding step 194 may be integrated into the support apparatus 10 at a select location.

Referring still to FIG. 12, in various examples, the folding step 194 may include a stabilizing panel 208 or multiple stabilizing panels 208. In such examples, the stabilizing panel 208 may be rotatably coupled to the second support panel 202, such as via an additional hinge assembly. The stabilizing panel 208 extends along the underlying surface to provide additional support and stability to the folding step 194. Additionally or alternatively, the stabilizing panel 208 may be separable from the folding step 194. In such examples, the stabilizing panel 208 may define a groove for receiving an end of the second support panel 202. In further non-limiting examples, the second support panel 202 may have an increased thickness at least proximate to a distal end thereof to increase a surface area of the second support panel 202 that engages the underlying surface. This configuration may also provide additional stability to the folding step 194.

The folding step 194 is configured to fold into the interior space defined by the base frame 14 below the upper frame 16, utilizing extra space in the support apparatus 10 that is often empty for the stowed position 26. The bracket 196 is configured to rotate about the respective frame member 190 to orient or move the first hinge assembly 204 into the interior space. In certain aspects, the bracket 196 is rotated to position the first hinge assembly 204 proximate to a lower inner edge of the frame member 190. With the movement of the first hinge assembly 204, the first support panel 200 is configured to extend into the support apparatus 10 below the upper frame 16, generally parallel with the underlying surface. The first support panel 200 may be disposed between the frame member 190 and/or between at least one of the frame members 190 and the underlying surface. The second support panel 202 rotates via the second hinge assembly 206 to fold and abut the first support panel 200.

Generally, the second support panel 202 rests on and is supported by the first support panel 200 in the interior space. In examples with the stabilizing panel 208, the stabilizing panel 208 may rotate to fold onto at least one of the support panels 200, 202. In examples without the bracket 196, the hinge assembly 204 may be located to allow about 180 degrees of rotation of the first support panel 200 to be in the interior space in the stowed position 26 and on an opposing side of the frame member 190 in the deployed position 24. The folded folding step 194 may be cantilevered in the stowed position 26 or may be supported by the frame assembly 12.

The folding step 194 may include the handle 66 for assisting the caregiver in moving the folding step 194 from the interior space. Additionally, the folding step 194 may include latching features 62, 64 for retaining the folding step 194 in the deployed position 24 and the stowed position 26. The folding step 194 can be utilized with other configurations of the support apparatus 10, such as on the support legs 44 or the base frame 14 of the support apparatus 10 configured as the stretcher. Further, the second support panel 202 may be configured to rotate to rest on the first support panel 200 in the deployed position 24, providing a cantilevered, folded step 194 that does not directly engage the underlying surface. This configuration may be advantageous for using the folding step 194 while the support apparatus 10 is moving during the transport process.

Referring again to FIG. 13, the support step 22 may be configured as a hanging step 220, and the coupling feature 60 may be configured as a support bar 222. Generally, the support bar 222 is coupled to the base frame 14, but may also be coupled to other locations on the support apparatus 10. The support bar 222 is configured as an elongated bar that protrudes from and extends generally parallel to the respective frame member 190.

The hanging step 220 includes a U-shaped bracket or hook 224, a step portion 226, and a support portion 228. The hook 224 is configured to extend between the frame member 190 and the support bar 222 to hang the hanging step 220 on the support bar 222. The hook 224 generally extends a same length as the step portion 226 to distribute the load along a greater area. The hook 224 extends toward the underlying surface adjacent to the base frame 14.

In the deployed position 24, the step portion 226 extends outward from the hook 224, away from the base frame 14. The step portion 226 generally extends parallel to the underlying surface to provide a place for the caregiver or the patient to step or stand. The support portion 228 extends from the step portion 226 to the underlying surface. The hanging step 220 may include the stabilizing panel 208 or have a stabilizing portion through an increased thickness of the support portion 228.

The hanging step 220 may have a fixed configuration, such that the step portion 226 and the support portion 228 have a fixed relationship. In such examples, the hanging step 220 is hooked on the support bar 222 in the deployed position 24 and removed from the support apparatus 10 to be stowed.

Additionally or alternatively, the step portion 226 may be rotatably coupled to the hook 224, and/or the support portion 228 may be rotatably coupled to the step portion 226. In such examples, the hanging step 220 may be folded and stored in the interior space of the base frame 14, on the upper surface 106 of the base frame 14 (see FIG. 5), or stowed in the storage feature 162 (FIG. 10). In this way, the hanging step

220 may be integrated into the support apparatus 10 or removable from the support apparatus 10. The engagement between the hook 224 and the support bar 222 may also allow the caregiver or the patient to move the hanging step 220 to a select or desired location about the support apparatus 10. Further, the support portion 228 may be configured to rotate to rest on the step portion 226 in the deployed position 24 such that the hanging step 220 forms a cantilevered hanging step 220 that does not directly engage the underlying surface. This configuration may be advantageous for using the hanging step 220 while the support apparatus 10 is moving during the transport process.

Referring again to FIGS. 1-13, the step assembly 20 includes at least one, but typically multiple support steps 22 coupled to the support apparatus 10. The support apparatus 10 generally includes at least two support steps 22, with one support step 22 on each lateral side of the frame assembly 12 to allow caregivers to access the patient from opposing sides. Typically, the first support step 22 is disposed at a first location and the second support step 22 is disposed at a second location on an opposite side of the support apparatus 10 relative to the first location. However, the two locations may be offset from one another without departing the teachings herein. The first and second locations are typically between the head end 48 and the center of the support apparatus 10, aligning the caregivers on the support steps 22 with the chest area of the patient.

In various aspects, the support apparatus 10 is the stretcher, which is used to transport the patient about the medical facility. In additional or alternative examples, the support apparatus 10 is the medical bed, which can also transport the patient about the medical facility. In various configurations, the support apparatus 10 is operable in a CPR mode. When the CPR mode is activated, the upper frame 16 quickly and efficiently lowers to a flat condition and lowers in height relative to the base frame 14. Additionally, siderails may be moved to a lowered position to increase access to the patient. As the support apparatus 10 is lowering in the CPR mode, the caregiver may move the support step 22 to the deployed position 24 and stand on the support step 22. The support steps 22 increase access to the chest of the patient and increase the height of the caregiver to maximize intrathoracic pressure provided during CPR. The increased height of the caregiver on the support step 22, particularly shorter caregivers, can move the mid-thigh areas of the caregiver to align with the chest area of the patient. This alignment may be advantageous for allowing the caregivers to provide optimal chest compressions to the patient without the caregiver kneeling on the surface assembly 50. The caregiver can "ride along" with the support apparatus 10 while providing CPR compressions to the patient.

Moreover, this side "ride along" position may be advantageous for providing a location for the caregiver using a manual resuscitator. The caregiver can stand on the support step 22 and focus on compressing the resuscitator and ensuring the resuscitator is secured on the patient, rather than dividing his or her attention to walking with the support apparatus 10. Manual resuscitators are often used during the transport process, and the support step 22 may maximize the care to the patient by providing this "ride along" platform.

Additionally or alternatively, the step assembly 20 may include an additional support step 22 coupled to a third location of the support apparatus 10, which may be the head end 48 of the frame assembly 12. This may be advantageous for allowing a ride-along position for the caregiver during the transport process. For example, the support apparatus 10 may be utilized in a power drive mode, where a power drive wheel is deployed to engage the underlying surface to help propel and drive the support apparatus 10. In such examples, the power drive system includes a motor operably coupled to the power drive wheel to cause rotation of the power drive wheel. The power drive system may be utilized with a brake system, which can operate in conjunction with the power drive system. It may be advantageous for the caregiver to stand on the support step 22 at the head end 48 of the support apparatus 10 to assist with driving and steering the support apparatus 10 as the power drive system propels the support apparatus 10.

While the support apparatus 10 is shown as having the support legs 44, the base support 40 may have a greater length, such that the rollers 18 are coupled to the base support 40. This increased size of the base support 40 may provide additional space for installing the support steps 22 below or on the base support 40. Additionally, multiple configurations of the support step 22 may be utilized on the support apparatus 10. For example, a first type of the support step 22 may be disposed proximate to the chest area of the patient, while a second type of the support step 22 may be disposed at the head end 48. The configuration of the support steps 22 utilized at specific locations may be chosen based on access to other portions of the support apparatus 10, access to devices on the support apparatus 10, access to the patient, movement of the rollers 18 relative to the underlying surface, etc.

The support steps 22 may be moved and used when the support apparatus 10 is stationary and when the support apparatus 10 is moving across the underlying surface. The step assembly 20 provides a location or multiple locations around the support apparatus 10 for the caregiver to stand to provide increased access to the patient. Further, some of the support steps 22 may be in fixed locations about the support apparatus 10, while other support steps 22 may be movable between different locations to maximize access to the patient. In various examples, the support step 22 may be moved to the deployed position 24 and back to the stowed position 26 while the support apparatus 10 is moving, providing increased flexibility during the transport process, which includes the movement of the support apparatus 10 as well as a predefined period before and after the active movement. In this way, the support step 22 is operable between the stowed position 26 and the deployed position 24 as the support apparatus 10 is moving, which may be advantageous when the caregiver desires to adjust their height relative to the support apparatus 10 during the transport process.

Further, the support step 22 may also be utilized by the caregiver or the patient as a stool for sitting or standing when the support apparatus 10 is stationary. Based on the position of the support steps 22, the support steps 22 may be utilized by the caregiver, as well as the patient. In such examples, the support step 22 may assist the patient in the ingress and egress from the support apparatus 10.

The step assembly 20 provides multiple support steps 22 for supporting the weight of the caregiver while the caregiver treats the patient. The caregiver may utilize the support steps 22 when the support apparatus 10 is stationary and moving. In various aspects, the support steps 22 may be stowed and deployed via the coupling feature 60, which may be welded or otherwise coupled to the frame assembly 12 and be constructed of a material with sufficient strength, such as metals and metal alloys, to support the weight of the caregiver. Generally, during the transport process, the support step 22 is cantilevered or otherwise supported by the support apparatus 10 without a direct engagement to the underlying surface, such that the coupling feature 60 and the support step 22 have sufficient strength to support the weight of the caregiver. The additional castor 112 may be utilized to bolster this support or bolster the stability of the support step 22. Further, the support step 22 may engage the underlying surface when the support apparatus 10 is stationary. The support step 22 may be coupled to the support apparatus 10 in various configurations, including slide-out, fold-down, stirrup- or pedal-style, pull-down, fixed platforms, rotating platforms, etc. The support step 22 is generally manually operable to provide the additional height when desired by the caregiver and to not impede the caregiver when the additional height is not desired.

Further, the support steps 22 may have linkages that allow for height adjustability of the support step 22 when in the deployed position 24. In such examples, the support step 22 may be moved to the deployed position 24 and then further adjusted to a selected height or predefined height relative to the underlying surface. For example, when the support step 22 aligns with the bottom surface 72 of the base support 40 the support step 22 may be between about 4 inches and about 8 inches from the underlying surface, and when the support step 22 aligns with the upper surface 106 of the base support 40, the support step 22 may be between about 8 inches and about 12 inches from the underlying surface. It is also contemplated that multiple support steps 22 may be stacked or arranged relative to one another to provide support at multiple heights at the same locations around the support apparatus 10. The height adjustability may be advantageous for caregivers of different heights.

Use of the present device may provide a variety of advantages. For example, the support apparatus 10 includes multiple support steps 22 for supporting the caregiver while the support apparatus 10 is stationary and while the support apparatus 10 is in transport. Further, the support step 22 increases the height of the caregiver relative to the patient, which optimizes access to the patient. Moreover, optimizing access for the caregivers may, consequently, optimize compressions for CPR, access for wound treatment, etc. Additionally, the support steps 22 provide a "ride along" platform for the caregiver to stand on during the transport process, which may reduce risks to the caregiver who is treating and caring for the patient. Also, the support steps 22 are operable between the stowed position 26 and the deployed position 24 while the support apparatus 10 is moving. Moreover, when the support apparatus 10 is stationary, the support steps 22 can be utilized as stairs or stools for the caregiver and the patient. Additionally, the support steps 22 are generally integrated into the support apparatus 10 often remaining coupled with the support apparatus 10. Moreover, the support steps 22 maximize generally unused space on the support apparatus 10, such as space between the upper frame 16 and the base frame 14 and between the base frame 14 and the underlying surface without substantially affecting the caregiver or the function of the support apparatus 10. Additional benefits and advantages realized and/or achieved.

The device disclosed herein is further summarized in the following paragraphs and is further characterized by combinations of any and all various aspects described herein.

According to another aspect of the present disclosure, a patient support apparatus includes a frame assembly. The base frame includes rollers for engaging an underlying surface and an upper frame is operably coupled to the base frame. The upper frame is adjustable relative to the base frame. A step assembly is operably coupled to the base frame. The step assembly includes at least one support step operable between a deployed position and a stowed position. The at least one support step is disposed between the base frame and the underlying surface when in the stowed position.

According to another aspect of the present disclosure, at least one support step translates along a horizontal plane between a stowed position and a deployed position.

According to another aspect of the present disclosure, a step assembly includes rails. At least one support step slides along the rails between a stowed position and a deployed position.

According to another aspect of the present disclosure, rails are coupled to a bottom surface of a base frame.

According to another aspect of the present disclosure, at least one support step rotates along a horizontal plane between a stowed position and a deployed position.

According to another aspect of the present disclosure, at least one support step is configured to rotate 90 degrees from a stowed position to a deployed position.

According to another aspect of the present disclosure, a step assembly includes a pivot arm extending outward from a base frame. At least one support step is rotatably coupled to the pivot arm.

According to another aspect of the present disclosure, a pivot arm is coupled to a bottom surface of a base frame.

According to another aspect of the present disclosure, at least one support step includes a first foot pedal and a second foot pedal.

According to another aspect of the present disclosure, a first foot pedal and a second foot pedal are independently operable between a stowed position and a deployed position.

According to another aspect of the present disclosure, a step assembly includes a first support link and a second support link coupled to a first foot pedal and a first support link and a second support link coupled to a second foot pedal.

According to another aspect of the present disclosure, each first support link is rotatably coupled to a base frame and each second support link is rotatably coupled to a respective first support link and to a respective foot pedal.

According to another aspect of the present disclosure, first support links rotate independently of second support links, respectively.

According to another aspect of the present disclosure, a frame assembly includes a storage feature coupled to a bottom surface of a base frame. At least one support step is disposed within the storage feature when in a stowed position.

According to another aspect of the present disclosure, at least one support step includes projections and a base frame defines a plurality of receiving apertures configured to selectively receive the projections of the at least one support step.

According to another aspect of the present disclosure, a plurality of receiving apertures are defined at multiple heights to provide different positions for the at least one support step.

According to another aspect of the present disclosure, at least one support step includes a first support step coupled to a frame assembly at a first location and a second support step coupled to a frame assembly at a second location.

According to another aspect of the present disclosure, a first location is a first side and a second location is a second opposing side of a frame assembly.

According to another aspect of the present disclosure, a first location and a second location are between a head end of a frame assembly and a center of the frame assembly to align with a chest area of a patient on the frame assembly.

According to another aspect of the present disclosure, at least one support step includes a third support step coupled to a frame assembly at a third location.

According to another aspect of the present disclosure, a third location is a head end of a frame assembly.

According to another aspect of the present disclosure, at least one support step is operable between the stowed position and the deployed position during a transport process as a frame assembly is moving.

According to another aspect of the present disclosure, at least one support step includes a caster coupled to a bottom surface of the at least one support step.

According to another aspect of the present disclosure, at least one support step includes a bracket operably coupled to a base frame, a first support panel rotatably coupled to the bracket via a first hinge assembly, and a second support panel rotatably coupled to the first support panel and configured to engage an underlying surface in a deployed position.

According to another aspect of the present disclosure, a patient support apparatus includes a frame assembly. A base frame includes rollers for engaging an underlying surface and an upper frame is operably coupled to the base frame. The upper frame is adjustable relative to the base frame. A step assembly is operably coupled to the frame assembly. The step assembly includes a coupling feature fixed to the frame assembly. The coupling feature is fixed to at least one of a bottom surface of the base frame, a side surface of the base frame, and a lower surface of the upper frame. At least one support step is coupled to the frame assembly via the coupling feature. The at least one support step is operable between a deployed position and a stowed position.

According to another aspect of the present disclosure, a stowed position is a vertical position adjacent to a side surface of a base frame, and a deployed position is a horizontal position extending from the side surface.

According to another aspect of the present disclosure, at least one support step includes a first support step coupled to a frame assembly at a first location and a second support step coupled to a frame assembly at a second location.

According to another aspect of the present disclosure, at least one support step is coupled to an upper frame.

According to another aspect of the present disclosure, at least one support step is coupled to an upper frame via a first support arm and a second support arm.

According to another aspect of the present disclosure, a first support arm is coupled to a lower surface of an upper frame. A second support arm is rotatably coupled to the first support arm.

According to another aspect of the present disclosure, at least one support step is rotatably coupled to a second support arm.

According to another aspect of the present disclosure, a stowed position is a vertical position adjacent to a lower surface of an upper frame.

According to another aspect of the present disclosure, a deployed position is a horizontal position proximate to a base frame.

According to another aspect of the present disclosure, at least one support step is coupled to a base frame via a pivot assembly to rotate between a deployed position and a stowed position.

According to another aspect of the present disclosure, a deployed position is a horizontal position for supporting a caregiver.

According to another aspect of the present disclosure, a stowed position is a vertical position with at least one support step extending toward an upper frame.

According to another aspect of the present disclosure, at least one support step is coupled to a base frame proximate to an edge between a bottom surface and a side surface of the base frame.

According to another aspect of the present disclosure, at least one support step includes a first support step coupled to a frame assembly at a first location and a second support step coupled to the frame assembly at a second location.

According to another aspect of the present disclosure, a patient support apparatus includes an upper frame that has a support surface. A surface assembly is disposed on the support surface. A base frame is operably coupled to the upper frame. The upper frame is movable relative to the base frame. The base frame includes a base support defining a recess. A recessed surface is defined in the recess. A protruding lip extends from the base support adjacent to the recess to extend the recessed surface to form a support step.

According to another aspect of the present disclosure, a sliding step panel is disposed on a recessed surface and operable between a stowed position and a deployed position.

According to another aspect of the present disclosure, a patient support apparatus includes a frame assembly including rollers for engaging an underlying surface. A step assembly is operably coupled to the frame assembly. The step assembly includes a first support step coupled to the frame assembly at a first location. The first support step is operable between a deployed position for supporting a caregiver and a stowed position. A second support step is coupled to the frame assembly at a second location. The first support step is operable between a deployed position for supporting a caregiver and a stowed position. Each of the first support step and the second support step are configured to be adjusted between the stowed position and the deployed position, respectively, as the frame assembly is moving across the underlying surface during a transport process.

According to another aspect of the present disclosure, a frame assembly includes a base support defining a recess, and a recessed surface is defined in the recess. A protruding lip extends from the base support adjacent to the recess to extend the recessed surface to form one of a first support step and a second support step. A sliding step panel is disposed on the recessed surface and operable between a stowed position and a deployed position.

According to another aspect of the present disclosure, a first location is a lateral side of a frame assembly, and a second location is a head end of the frame assembly.

According to another aspect of the present disclosure, a patient support apparatus includes a frame assembly including a base frame having a frame member. An upper frame is operably coupled to the base frame. A support step is operably coupled to the frame assembly. The support step is operable between a deployed position engaging an underlying surface and a stowed position disposed below the upper frame. The support step includes a bracket operably coupled to the frame member. A first support panel is rotatably coupled to the bracket via a first hinge assembly. A second support panel is rotatably coupled to the first support panel and configured to engage the underlying surface in the deployed position.

According to another aspect of the present disclosure, a patient support apparatus includes a frame assembly including a base frame having a frame member. An upper frame is operably coupled to the base frame. A support step is operably coupled to the frame assembly. The support step is operable between a deployed position engaging an underlying surface and a stowed position disposed below the upper frame. The support step includes a bracket operably coupled to the frame member. A first support panel is rotatably coupled to the bracket via a first hinge assembly. A second support panel is rotatably coupled to the first support panel and configured to engage the underlying surface in the deployed position.

According to another aspect of the present disclosure, a patient support apparatus includes a frame assembly including rollers for engaging an underlying surface. A step assembly is operably coupled to the frame assembly. The step assembly includes a first support step coupled to the frame assembly on a first side. The first support step is operable between a deployed position for supporting a caregiver and a stowed position. A second support step is coupled to the frame assembly at a head end. The first support step is operable between a deployed position for supporting a caregiver and a stowed position.

According to another aspect of the present disclosure, a support means includes a structure means including a base frame with moving means for engaging an underlying surface and an upper frame operably coupled to the base frame and adjustable relative to the base frame. A step means is operably coupled to the structure means. The step means includes a means for supporting a person coupled to the structure means. The means for supporting a person is coupled to the structure means via a coupling means fixed to the structure means. The means for supporting a person is operable between a deployed position and a stowed position.

Related applications, for example those listed herein, are fully incorporated by reference. Assertions within the related applications are intended to contribute to the scope and interpretation of the information disclosed herein. Any changes between any of the related applications and the present disclosure are not intended to limit the scope or interpretation of the information disclosed herein, including the claims. Accordingly, the present application includes the scope and interpretation of the information disclosed herein as well as the scope and interpretation of the information in any or all of the related applications.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, are illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A patient support apparatus, comprising:

a frame assembly including rollers for engaging an underlying surface and a base support having a top surface and a side surface that together define a recess; and a step assembly operably coupled to the frame assembly, wherein the step assembly includes:

a first support step coupled to the frame assembly at a first location, wherein the base support includes an upper recessed surface in the recess and a protruding lip extending from the base support to extend the upper recessed surface to form the first support step, and wherein the first support step is operable between a deployed position for supporting a caregiver and a stowed position; and a second support step coupled to the frame assembly at a second location, wherein the second support step is operable between a deployed position for supporting the caregiver and a stowed position, wherein each of the first support step and the second support step are configured to be adjusted between the stowed position and the deployed position, respectively, as the frame assembly is moving across the underlying surface during a transport process.

2. The patient support apparatus of claim 1, wherein the first support step includes a sliding step panel disposed on the upper recessed surface and operable between the stowed position and the deployed position.

3. The patient support apparatus of claim 1, wherein the first location is a lateral side of the frame assembly, and wherein the second location is a head end of the frame assembly.

* * * * *